US009972121B2

(12) United States Patent
Li et al.

(10) Patent No.: US 9,972,121 B2
(45) Date of Patent: May 15, 2018

(54) SELECTING TIME-DISTRIBUTED PANORAMIC IMAGES FOR DISPLAY

(71) Applicant: Google Inc., Mountain View, CA (US)

(72) Inventors: Wenfeng Li, Sunnyvale, CA (US); Allen Hutchison, San Jose, CA (US)

(73) Assignee: Google LLC, Mountain View, CA (US)

( * ) Notice: Subject to any disclaimer, the term of this patent is extended or adjusted under 35 U.S.C. 154(b) by 95 days.

(21) Appl. No.: 14/258,594

(22) Filed: Apr. 22, 2014

(65) Prior Publication Data

US 2015/0302633 A1  Oct. 22, 2015

(51) Int. Cl.
  *G06T 15/00* (2011.01)
  *G06T 15/10* (2011.01)
  *G06T 3/00* (2006.01)
  *G09G 5/14* (2006.01)

(52) U.S. Cl.
  CPC ............ *G06T 15/10* (2013.01); *G06T 3/0012* (2013.01); *G09G 5/14* (2013.01);
  (Continued)

(58) Field of Classification Search
  CPC .............. G06F 3/0481; G06F 3/04842; G06F 17/3087; G06F 3/147; G06F 3/04815; G06F 2203/04805; G06F 3/011; G06F 17/30873; G06F 17/3024; G06F 17/30265; G06Q 30/0256; G01C 21/26; G01C 21/32;
  (Continued)

(56) References Cited

U.S. PATENT DOCUMENTS 5,710,875 A * 1/1998 Harashima .............. G06T 15/10
                                                                345/419
5,754,174 A    5/1998 Carpenter et al.
(Continued)

FOREIGN PATENT DOCUMENTS

CN     102661748 A    9/2012
EP       1703426 A1   9/2006

OTHER PUBLICATIONS

Blackcoffee Design, 1000 Icons Symbols and Pictograms: Visual Communication for Every Language, Gloucester, MA: Rockport Publishers, 2006, 29, 49, 65, 101.
(Continued)

*Primary Examiner* — Devona E Faulk
*Assistant Examiner* — Charles L Beard
(74) *Attorney, Agent, or Firm* — Lerner, David, Littenberg, Krumholz & Mentlik, LLP

(57) ABSTRACT

Images may be automatically annotated with place identifiers based on textual metadata associated with the images. The quality of these place identifiers may be scored based on a number of different factors. For example, these annotations may also include confidence and topicality values indicative of the relationships between the place identifier and the text as well as topics of the text of the textual metadata. Images that also have additional location information that includes GPS coordinates or a location specified by a user, may be used to evaluate the quality of a given place identifier, combination of confidence and topicality values, and the overall annotation system. These valuations may, in turn, be used to score the quality of such automatic annotations of other images that do not have such additional location information.

20 Claims, 10 Drawing Sheets

(52) U.S. Cl.
CPC . *G09G 2340/045* (2013.01); *G09G 2360/122* (2013.01); *G09G 2380/10* (2013.01)

(58) Field of Classification Search
CPC ...... G01C 21/367; G09B 29/12; G06T 15/10; G06T 3/0012; G09G 5/14
See application file for complete search history.

(56) References Cited

U.S. PATENT DOCUMENTS

| | | | |
|---|---|---|---|
| D399,501 S | 10/1998 | Arora et al. | |
| 5,912,165 A | 6/1999 | Cabib et al. | |
| D418,495 S | 1/2000 | Brockel et al. | |
| 6,075,595 A | 6/2000 | Malinen | |
| 6,195,122 B1* | 2/2001 | Vincent | G01C 11/02 348/169 |
| 6,373,568 B1 | 4/2002 | Miller et al. | |
| 6,504,571 B1 | 1/2003 | Narayanaswami et al. | |
| D471,225 S | 3/2003 | Gray | |
| 6,769,131 B1* | 7/2004 | Tanaka | H04N 7/181 348/E7.086 |
| 7,009,699 B2 | 3/2006 | Wolleschensky et al. | |
| D523,442 S | 6/2006 | Hiramatsu | |
| D525,632 S | 7/2006 | Jost et al. | |
| D536,340 S | 2/2007 | Jost et al. | |
| 7,225,207 B1 | 5/2007 | Ohazama et al. | |
| D550,236 S | 9/2007 | Armendariz | |
| D555,664 S | 11/2007 | Nagata et al. | |
| D557,272 S | 12/2007 | Glaser et al. | |
| D558,220 S | 12/2007 | Maitlen et al. | |
| D561,191 S | 2/2008 | Haning et al. | |
| D563,975 S | 3/2008 | Vigesaa | |
| D566,716 S | 4/2008 | Rasmussen et al. | |
| 7,353,114 B1 | 4/2008 | Rohlf et al. | |
| D571,819 S | 6/2008 | Scott et al. | |
| D572,719 S | 7/2008 | Beamish et al. | |
| 7,398,156 B2* | 7/2008 | Funato | G01C 21/3679 340/988 |
| D574,388 S | 8/2008 | Armendariz et al. | |
| 7,420,598 B1* | 9/2008 | Ito | H04N 5/23293 348/240.2 |
| D578,544 S | 10/2008 | Nathan et al. | |
| 7,535,497 B2* | 5/2009 | Ouchi | G06T 3/4038 345/629 |
| D593,578 S | 6/2009 | Ball et al. | |
| D595,304 S* | 6/2009 | Rasmussen | D14/486 |
| 7,561,169 B2* | 7/2009 | Carroll | G06F 17/30241 340/539.2 |
| D599,812 S | 9/2009 | Hirsch | |
| D601,165 S | 9/2009 | Truelove et al. | |
| D601,166 S | 9/2009 | Chen et al. | |
| D602,495 S | 10/2009 | Urn et al. | |
| D605,657 S | 12/2009 | Denton | |
| D606,551 S | 12/2009 | Willis | |
| 7,720,359 B2* | 5/2010 | Koyanagi | H04N 5/232 348/36 |
| RE41,428 E | 7/2010 | Mayer et al. | |
| D619,614 S | 7/2010 | O'Mullan et al. | |
| D620,950 S | 8/2010 | Rasmussen | |
| 7,840,032 B2* | 11/2010 | Ofek | G06T 3/4038 345/629 |
| 7,912,634 B2 | 3/2011 | Reed et al. | |
| 7,921,108 B2 | 4/2011 | Wang et al. | |
| 7,971,155 B1 | 6/2011 | Yoon | |
| D642,195 S | 7/2011 | Marks et al. | |
| 7,983,489 B2* | 7/2011 | Aguera y Arcas | G06K 9/6211 358/403 |
| D645,052 S | 9/2011 | Rasmussen | |
| D645,470 S | 9/2011 | Matas | |
| 8,064,633 B2* | 11/2011 | Noda | G06F 17/30274 348/383 |
| 8,077,918 B2 | 12/2011 | Kirmse et al. | |
| D652,053 S | 1/2012 | Impas et al. | |
| 8,090,714 B2 | 1/2012 | Yang et al. | |
| 8,103,081 B2 | 1/2012 | Gossage et al. | |
| 8,145,703 B2* | 3/2012 | Frishert | G06F 17/3087 707/709 |
| D656,950 S | 4/2012 | Shallcross et al. | |
| D661,702 S | 6/2012 | Asai et al. | |
| D661,704 S | 6/2012 | Rasmussen | |
| 8,213,749 B2* | 7/2012 | Di Bernardo | G01C 11/02 340/995.1 |
| D664,983 S | 8/2012 | Moreau et al. | |
| D665,409 S | 8/2012 | Gupta et al. | |
| D667,432 S | 9/2012 | Phelan | |
| D667,834 S | 9/2012 | Coffman et al. | |
| 8,274,524 B1* | 9/2012 | Cornell | G08G 1/0969 345/428 |
| 8,302,007 B2* | 10/2012 | Barcay | G06T 19/003 382/154 |
| 8,339,394 B1* | 12/2012 | Lininger | G06T 15/04 345/419 |
| 8,352,465 B1* | 1/2013 | Jing | G06F 17/30867 707/723 |
| 8,422,825 B1* | 4/2013 | Neophytou | G06K 9/00214 382/103 |
| D682,842 S | 5/2013 | Kurata et al. | |
| D682,876 S | 5/2013 | MacNeil | |
| D683,356 S | 5/2013 | Hally | |
| D684,167 S | 6/2013 | Yang et al. | |
| 8,510,041 B1* | 8/2013 | Anguelov | G01C 21/32 701/445 |
| D689,072 S | 9/2013 | Park et al. | |
| D689,079 S | 9/2013 | Edwards et al. | |
| D689,082 S | 9/2013 | Stiffler | |
| D689,085 S | 9/2013 | Pasceri et al. | |
| D689,089 S | 9/2013 | Impas et al. | |
| 8,543,323 B1* | 9/2013 | Gold | G01C 21/26 340/988 |
| D690,737 S | 10/2013 | Wen et al. | |
| D692,450 S | 10/2013 | Convey et al. | |
| D696,279 S | 12/2013 | Bortman et al. | |
| 8,610,741 B2* | 12/2013 | Szeliski | G06T 13/80 345/629 |
| 8,649,663 B2* | 2/2014 | Saitou | G11B 27/105 386/239 |
| D701,879 S | 4/2014 | Foit et al. | |
| D701,882 S | 4/2014 | Soegiono et al. | |
| D706,822 S | 6/2014 | Wang | |
| D708,638 S | 7/2014 | Manzari et al. | |
| 8,791,983 B2* | 7/2014 | Shikata | H04N 5/232 348/36 |
| D712,920 S | 9/2014 | Sloo et al. | |
| D713,853 S | 9/2014 | Jaini et al. | |
| D715,316 S | 10/2014 | Hemeon et al. | |
| D715,820 S | 10/2014 | Rebstock | |
| D715,836 S | 10/2014 | Huang et al. | |
| 8,872,847 B2 | 10/2014 | Nash et al. | |
| D716,827 S | 11/2014 | Dowd | |
| 8,893,026 B2* | 11/2014 | Lindemann | G01C 11/02 348/36 |
| D719,186 S | 12/2014 | Kim | |
| 8,928,691 B2* | 1/2015 | Maurer | G01C 21/367 345/619 |
| 8,930,141 B2* | 1/2015 | Wither | G01C 21/3635 340/995.1 |
| D726,204 S | 4/2015 | Prajapati et al. | |
| D728,616 S | 5/2015 | Gomez et al. | |
| D730,379 S | 5/2015 | Xiong et al. | |
| D731,524 S | 6/2015 | Brinda et al. | |
| D731,545 S | 6/2015 | Lim et al. | |
| D732,062 S | 6/2015 | Kwon | |
| D732,567 S | 6/2015 | Moon et al. | |
| 9,047,692 B1* | 6/2015 | Seitz | G06T 3/4038 |
| D733,741 S | 7/2015 | Lee et al. | |
| D734,356 S | 7/2015 | Xiong et al. | |
| 9,106,872 B2* | 8/2015 | Tsurumi | G06K 9/00335 |
| D738,900 S | 9/2015 | Drozd et al. | |
| D738,901 S | 9/2015 | Amin | |
| D738,914 S | 9/2015 | Torres et al. | |
| 9,158,414 B1* | 10/2015 | Gluzberg | G06F 3/0418 |
| D743,984 S | 11/2015 | Salituri | |
| 9,189,839 B1* | 11/2015 | Sheridan | G06T 5/50 |

(56) References Cited

U.S. PATENT DOCUMENTS

| | | | |
|---|---|---|---|
| D745,020 S | 12/2015 | Mariet et al. | |
| D745,038 S | 12/2015 | Abbas | |
| D746,313 S | 12/2015 | Ivalmsley et al. | |
| D746,319 S | 12/2015 | Zhang et al. | |
| 9,218,682 B2* | 12/2015 | Arrasvuori | G06F 17/30241 |
| 9,218,789 B1* | 12/2015 | Lininger | G09G 5/14 |
| 9,225,947 B2* | 12/2015 | Lee | H04N 9/045 |
| D746,856 S | 1/2016 | Jiang et al. | |
| 9,244,940 B1* | 1/2016 | Donsbach | G06F 17/30241 |
| 9,256,961 B2* | 2/2016 | Lynch | G09B 29/007 |
| 9,256,983 B2* | 2/2016 | Lynch | G06T 19/00 |
| D754,720 S | 4/2016 | Yang | |
| 9,311,396 B2* | 4/2016 | Meadow | G06T 17/05 |
| 9,317,188 B2* | 4/2016 | Gregotski | G06F 3/0484 |
| 9,325,946 B2* | 4/2016 | Tanaka | G06F 17/30256 |
| D757,784 S | 5/2016 | Lee et al. | |
| 9,330,504 B2* | 5/2016 | Ege | G06T 19/20 |
| 9,377,320 B2* | 6/2016 | Sheridan | G01C 21/3644 |
| D762,238 S | 7/2016 | Day et al. | |
| D762,702 S | 8/2016 | Hoang et al. | |
| 9,424,536 B2 | 8/2016 | Bear et al. | |
| D766,263 S | 9/2016 | Rice et al. | |
| D767,589 S | 9/2016 | Ye et al. | |
| 9,442,956 B2* | 9/2016 | Konig | H04N 1/32101 |
| D768,178 S | 10/2016 | Valade et al. | |
| D769,279 S | 10/2016 | Woo et al. | |
| D769,931 S | 10/2016 | McMillan et al. | |
| 9,471,834 B1* | 10/2016 | Filip | G06K 9/00476 |
| 9,477,368 B1* | 10/2016 | Filip | G06F 17/30241 |
| 9,529,803 B2* | 12/2016 | Kisielius | G06F 17/30061 |
| D780,210 S * | 2/2017 | Kisielius | D14/486 |
| D780,211 S * | 2/2017 | Kisielius | D14/486 |
| D780,777 S | 3/2017 | Kisielius et al. | |
| D780,794 S * | 3/2017 | Kisielius | D14/486 |
| D780,795 S * | 3/2017 | Kisielius | D14/486 |
| D780,796 S * | 3/2017 | Kisielius | D14/486 |
| D780,797 S * | 3/2017 | Kisielius | D14/486 |
| D781,317 S * | 3/2017 | Kisielius | D14/486 |
| D781,318 S * | 3/2017 | Kisielius | D14/486 |
| D781,337 S * | 3/2017 | Kisielius | D14/486 |
| 9,601,087 B2* | 3/2017 | Suzuki | G09G 5/14 |
| 9,633,167 B2* | 4/2017 | Yoshioka | G06F 19/321 |
| 9,710,886 B2* | 7/2017 | Gold | G06T 3/4038 |
| 9,805,064 B2* | 10/2017 | Kojima | G06F 17/30256 |
| 9,864,481 B2* | 1/2018 | Misawa | G06F 3/0482 |
| 2001/0014185 A1 | 8/2001 | Chitradon et al. | |
| 2001/0017668 A1* | 8/2001 | Wilcock | G06F 17/30265 348/552 |
| 2002/0047895 A1* | 4/2002 | Bernardo | G01C 11/02 348/48 |
| 2002/0075322 A1 | 6/2002 | Rosenzweig et al. | |
| 2002/0122073 A1* | 9/2002 | Abrams | G06F 17/30884 715/838 |
| 2002/0171668 A1* | 11/2002 | Samra | G06F 17/241 345/619 |
| 2003/0025803 A1* | 2/2003 | Nakamura | H04N 7/147 348/218.1 |
| 2003/0030636 A1* | 2/2003 | Yamaoka | G06T 1/0007 345/419 |
| 2003/0117611 A1* | 6/2003 | Chon | G06T 7/80 356/5.01 |
| 2003/0142523 A1 | 7/2003 | Biacs | |
| 2004/0001109 A1 | 1/2004 | Blancett et al. | |
| 2004/0125133 A1* | 7/2004 | Pea | G06F 17/30014 715/751 |
| 2004/0125148 A1* | 7/2004 | Pea | H04N 5/262 715/802 |
| 2004/0196282 A1* | 10/2004 | Oh | G06T 7/97 345/419 |
| 2004/0264919 A1* | 12/2004 | Taylor | G11B 27/034 386/223 |
| 2005/0063608 A1* | 3/2005 | Clarke | G06T 3/4038 382/284 |
| 2005/0216186 A1* | 9/2005 | Dorfman | G06F 17/30241 701/408 |
| 2005/0232606 A1* | 10/2005 | Hosoda | G11B 27/034 386/219 |
| 2006/0041591 A1 | 2/2006 | Rhoads | |
| 2006/0120624 A1* | 6/2006 | Jojic | G06F 17/30843 382/284 |
| 2006/0181546 A1 | 8/2006 | Jung et al. | |
| 2006/0203335 A1* | 9/2006 | Martin | G02B 27/2214 359/462 |
| 2006/0208926 A1 | 9/2006 | Poor et al. | |
| 2006/0221229 A1* | 10/2006 | Ogawa | H04N 5/232 348/367 |
| 2006/0238379 A1* | 10/2006 | Kimchi | G01C 21/26 340/995.1 |
| 2006/0251338 A1* | 11/2006 | Gokturk | G06F 17/30253 382/305 |
| 2006/0266942 A1* | 11/2006 | Ikeda | H04N 5/23238 250/334 |
| 2006/0271287 A1* | 11/2006 | Gold | G01C 21/26 701/426 |
| 2007/0024722 A1* | 2/2007 | Eura | G06F 17/30265 348/231.2 |
| 2007/0081081 A1* | 4/2007 | Cheng | G06T 3/4038 348/218.1 |
| 2007/0096945 A1 | 5/2007 | Rasmussen et al. | |
| 2007/0110338 A1* | 5/2007 | Snavely | G06F 17/30274 382/305 |
| 2007/0113255 A1* | 5/2007 | Kurosawa | G08B 13/19682 725/105 |
| 2007/0136259 A1* | 6/2007 | Dorfman | G01C 21/26 |
| 2007/0150188 A1 | 6/2007 | Rosenberg | |
| 2007/0216709 A1* | 9/2007 | Kojima | G06F 3/1415 345/619 |
| 2007/0250477 A1 | 10/2007 | Bailly | |
| 2007/0279438 A1* | 12/2007 | Takakura | G06F 3/0481 345/629 |
| 2008/0002962 A1* | 1/2008 | Ito | G03B 37/06 396/287 |
| 2008/0016472 A1 | 1/2008 | Rohlf et al. | |
| 2008/0043020 A1 | 2/2008 | Snow et al. | |
| 2008/0060004 A1* | 3/2008 | Nelson | H04N 7/18 725/37 |
| 2008/0066000 A1* | 3/2008 | Ofek | G06F 17/30241 715/757 |
| 2008/0077597 A1* | 3/2008 | Butler | G06F 17/30265 |
| 2008/0089593 A1* | 4/2008 | Ohwa | G06F 17/30265 382/225 |
| 2008/0158366 A1* | 7/2008 | Jung | G03B 17/20 348/207.1 |
| 2008/0174593 A1 | 7/2008 | Ham et al. | |
| 2008/0198178 A1* | 8/2008 | Julin | G06L 3/40 345/661 |
| 2008/0291201 A1* | 11/2008 | Lafon | G06T 15/205 345/427 |
| 2008/0291217 A1* | 11/2008 | Vincent | G06T 17/05 345/629 |
| 2008/0292213 A1* | 11/2008 | Chau | G06F 17/30265 382/294 |
| 2009/0046057 A1 | 2/2009 | Umezawa | |
| 2009/0063424 A1* | 3/2009 | Iwamura | G06F 17/30241 |
| 2009/0064014 A1* | 3/2009 | Nelson | H04N 7/163 715/764 |
| 2009/0202102 A1* | 8/2009 | Miranda | G06T 1/0007 382/100 |
| 2009/0240431 A1* | 9/2009 | Chau | G01C 21/3647 701/532 |
| 2009/0279794 A1* | 11/2009 | Brucher | G06F 17/30 382/225 |
| 2009/0284551 A1* | 11/2009 | Stanton | G06F 3/14 345/629 |
| 2009/0290812 A1* | 11/2009 | Naaman | G06F 17/30241 382/305 |
| 2009/0303251 A1 | 12/2009 | Balogh et al. | |
| 2010/0064239 A1 | 3/2010 | Crawford et al. | |

(56) References Cited

U.S. PATENT DOCUMENTS

| | | | |
|---|---|---|---|
| 2010/0115455 A1* | 5/2010 | Kim | G06F 3/04815 715/781 |
| 2010/0122208 A1* | 5/2010 | Herr | G06F 3/04845 715/799 |
| 2010/0149212 A1* | 6/2010 | Fukuya | G06F 17/30241 345/629 |
| 2010/0173678 A1* | 7/2010 | Kim | H04N 5/23216 455/566 |
| 2010/0184451 A1* | 7/2010 | Wang | G06F 17/30265 455/456.1 |
| 2010/0215250 A1* | 8/2010 | Zhu | G06T 17/05 382/154 |
| 2010/0215254 A1* | 8/2010 | Prokhorov | G06K 9/3241 382/159 |
| 2010/0250581 A1* | 9/2010 | Chau | G06F 17/30265 707/769 |
| 2010/0305844 A1* | 12/2010 | Choi | G01C 21/3423 701/533 |
| 2010/0309512 A1 | 12/2010 | Onoda | |
| 2010/0316357 A1* | 12/2010 | Saitou | G11B 27/105 386/326 |
| 2011/0007094 A1 | 1/2011 | Nash et al. | |
| 2011/0007130 A1* | 1/2011 | Park | H04N 5/232 348/38 |
| 2011/0010668 A1* | 1/2011 | Feldstein | G06F 3/0488 715/822 |
| 2011/0016398 A1* | 1/2011 | Hanes | G11B 27/105 715/730 |
| 2011/0022634 A1* | 1/2011 | Takata | G06T 3/4007 707/776 |
| 2011/0050706 A1* | 3/2011 | Cherna | G06T 11/60 345/441 |
| 2011/0055749 A1* | 3/2011 | Wallace | G06F 17/30265 715/772 |
| 2011/0074707 A1 | 3/2011 | Watanabe et al. | |
| 2011/0074811 A1* | 3/2011 | Hanson | G06T 11/00 345/629 |
| 2011/0085778 A1* | 4/2011 | Iwase | G11B 27/034 386/228 |
| 2011/0123120 A1* | 5/2011 | Quack | G06F 17/30256 382/197 |
| 2011/0141103 A1* | 6/2011 | Cohen | G02B 21/367 345/419 |
| 2011/0173565 A1* | 7/2011 | Ofek | G06T 5/50 715/790 |
| 2011/0211764 A1* | 9/2011 | Krupka | G06F 17/30247 382/225 |
| 2011/0234832 A1* | 9/2011 | Ezoe | H04N 5/232 348/222.1 |
| 2011/0249166 A1* | 10/2011 | Moriyama | H04N 1/00132 348/333.02 |
| 2011/0254976 A1* | 10/2011 | Garten | G06F 3/1454 348/229.1 |
| 2011/0302527 A1 | 12/2011 | Chen et al. | |
| 2012/0011464 A1* | 1/2012 | Hayashi | H04N 1/00458 715/784 |
| 2012/0011593 A1* | 1/2012 | Oka | G06F 21/6218 726/27 |
| 2012/0062695 A1* | 3/2012 | Sakaki | G08B 13/19691 348/36 |
| 2012/0075410 A1* | 3/2012 | Matsumoto | H04N 5/23245 348/36 |
| 2012/0092447 A1* | 4/2012 | Jeong | H04L 51/08 348/36 |
| 2012/0098854 A1* | 4/2012 | Ohnishi | G03B 21/26 345/626 |
| 2012/0127066 A1* | 5/2012 | Iida | G06F 17/30017 345/84 |
| 2012/0169769 A1* | 7/2012 | Minamino | G06T 17/05 345/629 |
| 2012/0188247 A1* | 7/2012 | Cheung | G06Q 30/0277 345/428 |
| 2012/0191339 A1* | 7/2012 | Lee | G01C 21/3647 701/410 |
| 2012/0194547 A1* | 8/2012 | Johnson | G06T 11/00 345/632 |
| 2012/0242783 A1* | 9/2012 | Seo | H04N 5/23238 348/36 |
| 2012/0281119 A1* | 11/2012 | Ohba | H04N 9/8205 348/240.2 |
| 2012/0293607 A1* | 11/2012 | Bhogal | G06T 3/4038 348/36 |
| 2012/0300019 A1* | 11/2012 | Yang | H04N 5/23232 348/36 |
| 2012/0301039 A1* | 11/2012 | Maunder | G06F 17/30265 382/225 |
| 2012/0316782 A1* | 12/2012 | Sartipi | G01C 21/367 701/455 |
| 2013/0035853 A1* | 2/2013 | Stout | G06T 17/05 701/438 |
| 2013/0076784 A1* | 3/2013 | Maurer | G01C 21/367 345/629 |
| 2013/0076888 A1* | 3/2013 | Hibino | G02B 21/025 348/79 |
| 2013/0100114 A1* | 4/2013 | Lynch | G01C 21/3638 345/419 |
| 2013/0106990 A1* | 5/2013 | Williams | G06T 3/4038 348/36 |
| 2013/0182108 A1* | 7/2013 | Meadow | G06T 17/05 348/143 |
| 2013/0201216 A1* | 8/2013 | Nakamura | G06T 19/006 345/633 |
| 2013/0239057 A1 | 9/2013 | Ubillos et al. | |
| 2013/0294650 A1* | 11/2013 | Fukumiya | H04N 21/41415 382/103 |
| 2013/0321461 A1* | 12/2013 | Filip | G06F 3/011 345/632 |
| 2013/0332890 A1* | 12/2013 | Ramic | G06F 3/04815 715/852 |
| 2014/0002439 A1* | 1/2014 | Lynch | G09B 29/007 345/419 |
| 2014/0002440 A1* | 1/2014 | Lynch | G06T 19/00 345/419 |
| 2014/0016193 A1* | 1/2014 | Terashima | G02B 7/102 359/462 |
| 2014/0023355 A1* | 1/2014 | Terashima | H04N 5/23212 396/87 |
| 2014/0078177 A1* | 3/2014 | Yamaji | G06F 17/3028 345/634 |
| 2014/0078263 A1* | 3/2014 | Kim | G06T 7/285 348/47 |
| 2014/0079322 A1* | 3/2014 | Yamaji | G06K 9/00536 382/209 |
| 2014/0118405 A1* | 5/2014 | Chand | G06T 3/40 345/661 |
| 2014/0164988 A1 | 6/2014 | Barnett et al. | |
| 2014/0181259 A1* | 6/2014 | You | H04L 65/4069 709/219 |
| 2014/0184727 A1* | 7/2014 | Xiao | H04N 7/15 348/14.07 |
| 2014/0210940 A1* | 7/2014 | Barnes | H04N 13/0022 348/36 |
| 2014/0240455 A1* | 8/2014 | Subbian | H04N 7/183 348/39 |
| 2014/0244160 A1* | 8/2014 | Cragun | G01C 21/20 701/436 |
| 2014/0253542 A1* | 9/2014 | Jung | G06T 3/40 345/419 |
| 2014/0253693 A1* | 9/2014 | Shikata | H04N 1/2112 348/47 |
| 2014/0320488 A1* | 10/2014 | Ege | G06T 17/05 345/420 |
| 2014/0362108 A1* | 12/2014 | Aguera-Arcas | G06T 17/005 345/629 |
| 2014/0376823 A1* | 12/2014 | Cui | H04N 1/00137 382/219 |
| 2015/0009327 A1* | 1/2015 | Love | H04N 7/181 348/148 |

(56) References Cited

U.S. PATENT DOCUMENTS

| | | | |
|---|---|---|---|
| 2015/0077521 A1* | 3/2015 | Borchert | H04N 13/0239 348/47 |
| 2015/0109328 A1* | 4/2015 | Gallup | G06F 3/0488 345/629 |
| 2015/0109513 A1* | 4/2015 | Nayar | H04N 5/23212 348/349 |
| 2015/0113474 A1* | 4/2015 | Gallup | G06F 3/04845 715/784 |
| 2015/0130848 A1* | 5/2015 | Sakaniwa | G06T 17/05 345/666 |
| 2015/0154736 A1* | 6/2015 | Seitz | G06T 3/4038 348/36 |
| 2015/0161807 A1* | 6/2015 | Pack | H04N 5/23229 345/629 |
| 2015/0170615 A1* | 6/2015 | Siegel | G09G 5/36 345/629 |
| 2015/0185018 A1* | 7/2015 | Hesch | G01C 21/165 701/501 |
| 2015/0185873 A1* | 7/2015 | Ofstad | G06F 3/0346 345/158 |
| 2015/0185991 A1* | 7/2015 | Ho | G06F 3/0484 715/771 |
| 2015/0235398 A1* | 8/2015 | Kim | G06T 11/60 345/633 |
| 2015/0248197 A1* | 9/2015 | Peters | A61B 6/463 715/838 |
| 2015/0262391 A1* | 9/2015 | Chau | G06K 9/00476 345/440 |
| 2015/0278878 A1* | 10/2015 | Chau | G06Q 30/0276 705/14.72 |
| 2015/0301695 A1* | 10/2015 | Leong | G06F 17/30017 715/838 |
| 2016/0005437 A1* | 1/2016 | Barry | G06F 17/30026 386/282 |
| 2016/0014190 A1* | 1/2016 | Sheory | H04L 67/02 715/739 |
| 2016/0019223 A1* | 1/2016 | Kisielius | G06F 17/30061 715/849 |
| 2016/0019713 A1* | 1/2016 | Dillard | G06T 15/503 345/419 |
| 2016/0048934 A1* | 2/2016 | Gross | G06K 9/00637 705/313 |
| 2016/0063516 A1* | 3/2016 | Terrazas | G06Q 30/0201 705/7.29 |
| 2016/0069703 A1* | 3/2016 | Nakano | G01C 21/3644 701/428 |
| 2016/0080654 A1* | 3/2016 | Chang | G06T 5/002 348/208.99 |
| 2016/0140744 A1* | 5/2016 | Strelow | G06T 11/60 382/284 |
| 2016/0156840 A1* | 6/2016 | Arai | H04N 5/23219 348/77 |
| 2016/0179760 A1* | 6/2016 | Strong | G06F 3/0482 715/788 |
| 2016/0209648 A1* | 7/2016 | Haddick | G02B 27/0093 |
| 2016/0321783 A1* | 11/2016 | Citrin | G06T 3/4038 |
| 2016/0349066 A1* | 12/2016 | Chung | G01C 21/3415 |
| 2017/0104938 A1* | 4/2017 | Shimosato | H04N 5/23251 |
| 2017/0132224 A1* | 5/2017 | Yang | G06F 17/3028 |
| 2017/0199050 A1* | 7/2017 | Masuko | G01C 21/3617 |
| 2017/0205997 A9* | 7/2017 | Gold | G06F 3/04847 |
| 2017/0308752 A1* | 10/2017 | Takeuchi | G06K 9/00684 |

OTHER PUBLICATIONS

Iconfinder, "Expand Icons", [unknown date], Iconfinder [online], [site visited Oct. 19, 2015]. Available from internet: <URL:https://www.iconfinder.com/search/?q=expand>.
Frutiger, Adrian, Signs and Symbols: their design and meaning, New York: Watson-Guptill Publications, 1998, 337, 350.
Dreyfuss, Henry, Symbol Sourcebook, New York: Van Nostrand Reinhold Co., 1972, 28.
Taylor, Frank, New Google Maps Moon Update, Sep. 13, 2007, Google Earth Blog [online], [site visited Oct. 15, 2015]. Available from Internet: <URL: https://www.gearthblog.com/blog/archives/2007/09/new_goolge_maps_moon_update.html>.
Abair, Randy, Google Maps Changes, Sep. 2013 Online Marketing Year in Review, Jan. 2, 2014, Vermont DesignWorks Blog [online], [site visited Oct. 15, 2015]. Available from Internet: <URL: http://www.vtdesignworks.com/blog/seo-2013>.
GordyHanner, Why can't I watch Videos in full screen on Youtube?, Dec. 6, 2010, Youtube [online], [site visited Oct. 15, 2015]. Available from Internet: <URL:https://www.youtube.com/watch?v=8n7nn-3CI2A>.
Clohessy, James W. and Patrick J Cerra, How do you warn 19 million people at the drop of a hat?, ArcNews, Fall 2011, [online], [site visited Oct. 15, 2015]. Available from Internet: <URL:https://www.esri.com/news/arcnews/fall11articles/how-do-you-warn-19-million-people-at-the-drop-of-a-hat.html>.
Icons, Google Design Library, updated, Google Inc. [online], [site visited Oct. 19, 2015]. Available from Internet: <https://www.google.com/design/icons/>.
Barclay, et al., "Microsoft TerraServer: A Spatial Data Warehouse", 2005.
Bauman, "Raster Databases", 2007.
Bhagavathy et al., "Modeling and Detection of Geospatial Objects Using Texture Motifs" 3706 IEEE Transactions on Geoscience and Remote Sensing. vol. 44, No. 12, Dec. 2006.
Conti et al., "DentroTrento—A virtual Walk Across history", 2006, pp. 318-321.
European Examination Report for Application No. 09810353.4 dated Oct. 18, 2012.
European Office Action for Application No. 09810353 dated Oct. 9, 2013.
Gail Langran, Nicholas R. Chrisman: "A Framework for temporal Geographic Information", University of Washington Cartographica, vol. 25, No. 3, Dec. 31, 1988 (Dec. 31, 1988), pp. 1-14, Retrieved from the Internet: URL:http://www.unigis.ac.at/fernstudien/unigis_professional/lehrgangs_cd_1.../module//modul2/Temporal%20Geographic%20Information.pdf.
Ghemawat, et al. "The Google File System", 2003.
Haval, "Three-Dimensional Documentation of Complex Heritage Structures", Interpretive Enviornments, Apr.-Jun. 2000, pp. 52-55. http://ieeexplore.ieee.org/search retrieved from the Internet on Sep. 7, 2010.
International Search Report, PCT/US09/04817, dated Oct. 8, 2009.
Magnenat-Thalmann et al., "Real-Time Animation of Ancient Roman Sites", 2006, pp. 19-30.
Nan L. et al., "A spatial-temporal system for dynamic cadastral management," Journal of Environmental Management, Academic Press, London, GB, vol. 78, No. 4, Mar. 1, 2006 (Mar. 1, 2006), pp. 373-381, retrieved on Mar. 1, 2006.
Potmesil M., "Maps alive: Viewing geospacial information on the WWW", Computer Systems and ISDN Systems, North Holland Publishing, Amsterdam, NL, vol. 29, No. 8-13, Sep. 1, 1997 (Sep. 1, 1997), pp. 1327-1342, XP004095328.
Rocchini D. et al., "Landscape change and the dynamics of open formations in a natural reserve," Landscape and urban Planning, Elsevier, vol. 77, No. 1-2, Jun. 15, 2006 (Jun. 15, 2006), pp. 167-177, retrieved on Jun. 15, 2006.
Scranton et al., "Sky in Google Earth: The Next Frontier in Astronomical Data Discovery and Visualization", http://earth.google.com/sky/, Sep. 10, 2007.
The extended European search report, Application No. EP 09 81 0353.4, PCT/US2009004817, dated, Dec. 5, 2011.
U.S. Appl. No. 11/415,960, Zelirilca et al., "Coverage Mask Generation for Large Images", filed May 2, 2006.
U.S. Appl. No. 11/437,553, "Large-Scale Image Processing Using Mass Parallelizallon Techniques", filed May 19, 2006.
U.S. Appl. No. 11/473,461, Kirmse et al, "Hierarchical Spatial Data Structure and 3D Index Data Verseoning for Generating Packet Data", filed Jun. 22, 2006.
U.S. Appl. No. 13/854,314, filed Apr. 1, 2013.

(56) References Cited

OTHER PUBLICATIONS

U.S. Appl. No. 13/870,419, filed Apr. 25, 2013.
Vlahakis et al., "Archeoguide: An Augmented Reality Guide for Archaeological Sites", IEEE Computer Graphics and Applications, Sep./Oct. 2002, pp. 52-60.
Wu, et al, "Automatic Alignment of Large-scale Aerial Rasters to Road-maps" Proceedings of the 15th international Symposium on Advances in Geographic information Systems, 2007.
International Preliminary Report on Patentability for PCT Application No. PCT/US2015/025551, dated Nov. 3, 2016.
Wikipedia, Google Street View, Sep. 3, 2014, wikipedia.com [online], [site visited Apr. 11, 2016]. Available from Internet: <https://en.wikipedia.org/wiki/Google Street_View>.
Wikipedia, Google Maps Street View redesign, Jun. 10, 2014, wikipedia.com [online], [site visited Nov. 7, 2016]. Available from Internet: <https//en.wikipedia.org/wiki/Google_Maps>.
Snavely et al., "Photo Tourism: Exploring Photo Collections in 3D", 2006, Particularly see: Figs. 1 (c), 5, Section 5.1, 12 pages.
First Office Action dated Mar. 20, 2018, for Chinese Patent Application No. 201580020984.2.

\* cited by examiner

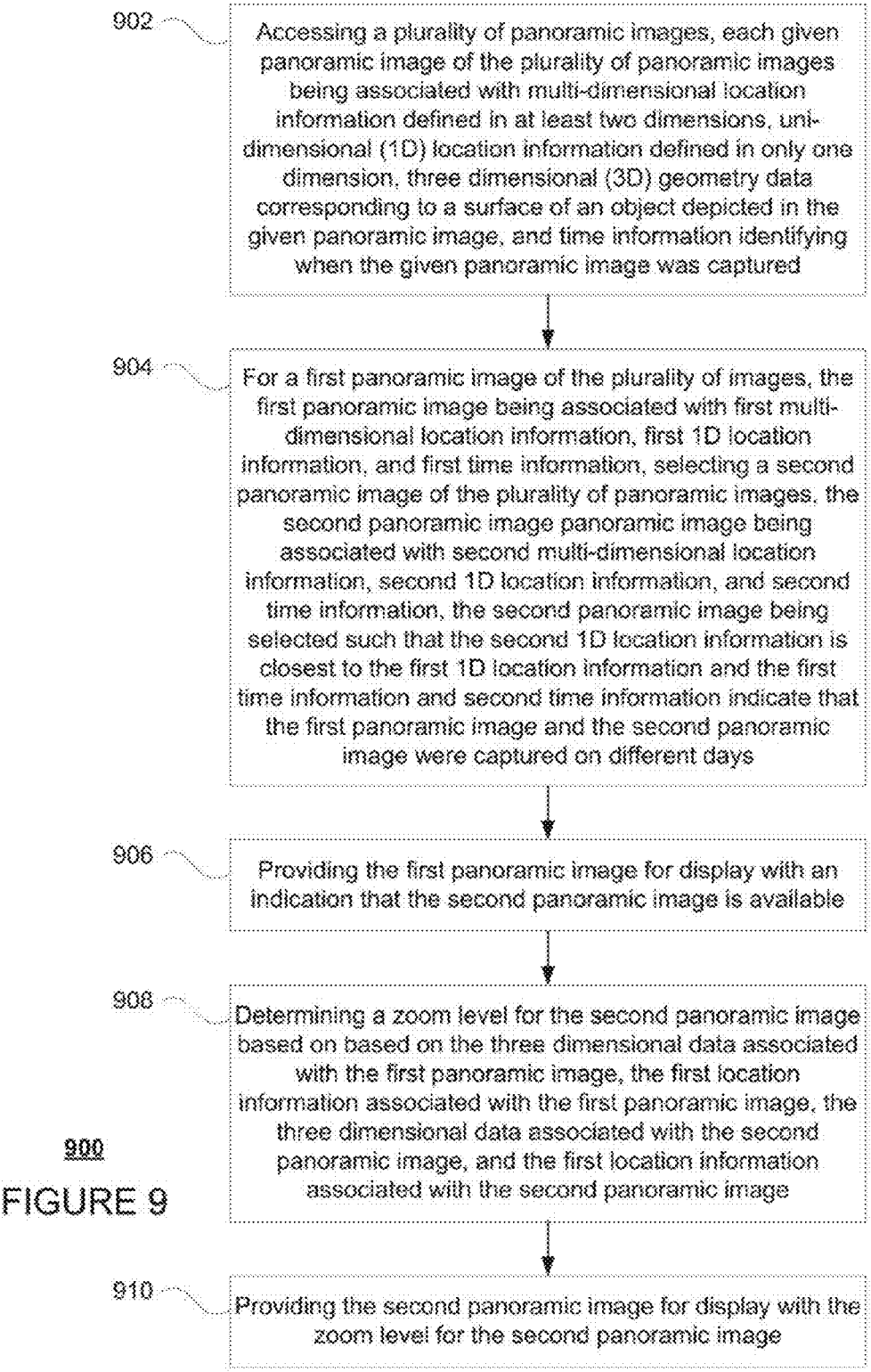

SELECTING TIME-DISTRIBUTED PANORAMIC IMAGES FOR DISPLAY

BACKGROUND

Various systems provide users with images of different locations, including panoramic images. For example, a panoramic image may include an image or collection of images having a field of view which is greater than that of the human eye, e.g., 180 degrees or greater. Some panoramic images may provide a 360-degree view of a location.

Some systems allow users to view images in sequences, such as in time or space. In some examples, these systems can provide a navigation experience in a remote or interesting location. Some systems allow users to feel as if they are rotating within a virtual world by clicking on the edges of a displayed portion of a panorama and having the panorama appear to "rotate" in the direction of the clicked edge.

SUMMARY

Aspects of the disclosure provide a computer implemented method for selecting time-distributed panoramas for display. The method includes accessing, by one or more computing devices, a plurality of panoramic images. Each given panoramic image of the plurality of panoramic images is associated with multi-dimensional location information defined in at least two dimensions, uni-dimensional (1D) location information defined in only one dimension, three dimensional (3D) geometry data corresponding to a surface of an object depicted in the given panoramic image, and time information identifying when the given panoramic image was captured. For a first one of the plurality of panoramic images that is associated with first multi-dimensional location information, first 1D location information, and first time information, the one or more computing devices select a second panoramic image of the plurality of panoramic images. The second panoramic image panoramic image is associated with second multi-dimensional location information, second 1D location information, and second time information. The second panoramic image is selected such that the second 1D location information is closest to the first 1D location information and the first time information and second time information indicate that the first panoramic image and the second panoramic image were captured on different days. The one or more computing devices provide the first panoramic image for display with an indication that the second panoramic image is available. The one or more computing devices also determine a zoom level for the second panoramic image based on the first 3D geometry data, the first multi-dimensional location information, the second 3D geometry data, and the second multi-dimensional location information. The one or more computing devices provide the second panoramic image for display with the zoom level for the second panoramic image.

In one example, the method also includes receiving view port information identifying a viewing angle of a display of the first panoramic image and a zoom level of the display of the first panoramic image. In this example, determining the zoom level for the second panoramic image further includes identifying a first distance to a three dimensional point on a surface of an object in the viewing angle of the display of the first panoramic image based on the first 3D geometry data, the first multi-dimensional location information, and the zoom level of the display of the first panoramic image; identifying a second distance to the three dimensional point on the surface of the object in the second panoramic image based on the first location information and the second 3D geometry data; and determining the zoom level for the second panoramic image using at least the first distance and the second distance. In addition, determining the zoom level for the second panoramic image is further based on a ratio of the first distance to the second distance. Also, the second distance is a linear distance between the three dimensional point and the second location information. In some examples, when the zoom level of the display of the first panoramic image indicates that the first panoramic is not zoomed in, the first distance is a linear distance between the first location of the first panoramic image and the three dimensional point on the surface of the object in the viewing angle of the display of the first panoramic image. In other such examples, the view port information further identifies a viewing angle of a display of the first panoramic image, and the method also includes determining a viewing angle of the second panoramic image based on the viewing angle and the viewing angle for the second panoramic image is provided with the second panoramic image. In another example, the 1D location information associated with each particular panoramic image of the plurality of panoramic images is defined relative to a point on a line corresponding to a portion of road.

Another aspect of the disclosure provides a system comprising one or more computing devices. The one or more computing devices are configured to access a plurality of panoramic images. Each given panoramic image of the plurality of panoramic images being associated with multi-dimensional location information defined in at least two dimensions, uni-dimensional (1D) location information defined in only one dimension, three dimensional (3D) geometry data corresponding to a surface of an object depicted in the given panoramic image, and time information identifying when the given panoramic image was captured. For a first one of the plurality of panoramic images associated with first multi-dimensional location information, first 1D location information, and first time information, the one or more computing devices are configured to select a second panoramic image of the plurality of panoramic images. The second panoramic image panoramic image is associated with second multi-dimensional location information, second 1D location information, and second time information. The second panoramic image is selected such that the second 1D location information is closest to the first 1D location information and the first time information and second time information indicate that the first panoramic image and the second panoramic image were captured on different days. The one or more computing devices are also configured to provide the first panoramic image for display with an indication that the second panoramic image is available and determine a zoom level for the second panoramic image based on the first 3D geometry data, the first multi-dimensional location information, the second 3D geometry data, and the second multi-dimensional location information. The one or more computing devices are also configured to provide the second panoramic image for display with the zoom level for the second panoramic image.

In one example, the one or more computing devices are further configured to receive view port information identifying a viewing angle of a display of the first panoramic image and a zoom level of the display of the first panoramic image. In this example, the one or more computing devices are configured to determine the zoom level for the second panoramic image by also identifying a first distance to a three dimensional point on a surface of an object in the viewing angle of the display of the first panoramic image based on the first 3D geometry data, the first multi-dimensional location information, and the zoom level of the display of the first panoramic image; identifying a second distance to the three dimensional point on the surface of the object in the second panoramic image based on the first location information and the second 3D geometry data; and determining the zoom level for the second panoramic image using at least the first distance and the second distance. In this example, determining the zoom level for the second panoramic image is further based on a ratio of the first distance to the second distance. Also, the second distance is a linear distance between the three dimensional point and the second location information. In some examples, when the zoom level of the display of the first panoramic image indicates that the first panoramic is not zoomed in, the first distance is a linear distance between the first location of the first panoramic image and the three dimensional point on the surface of the object in the viewing angle of the display of the first panoramic image. In other such examples, the view port information further identifies a viewing angle of a display of the first panoramic image, and the one or more computing devices are also configured to determine a viewing angle of the second panoramic image based on the viewing angle and the viewing angle for the second panoramic image is provided with the second panoramic image. In another example, the 1D location information associated with each particular panoramic image of the plurality of panoramic images is defined relative to a point on a line corresponding to a portion of road.

A further aspect of the disclosure provides a non-transitory computer-readable storage medium on which computer readable instructions of a program are stored. The instructions, when executed by one or more processors, cause the one or more processors to perform a method. The method includes accessing a plurality of panoramic images. Each given panoramic image of the plurality of panoramic images being associated with multi-dimensional location information defined in at least two dimensions, uni-dimensional (1D) location information defined in only one dimension, three dimensional (3D) geometry data corresponding to a surface of an object depicted in the given panoramic image, and time information identifying when the given panoramic image was captured. For a first one of the plurality of panoramic images associated with first multi-dimensional location information, first 1D location information, and first time information, the method includes selecting a second panoramic image of the plurality of panoramic images. The second panoramic image panoramic image being associated with second multi-dimensional location information, second 1D location information, and second time information, the second panoramic image being selected such that the second 1D location information is closest to the first 1D location information and the first time information and second time information indicate that the first panoramic image and the second panoramic image were captured on different days. The method also includes providing the first panoramic image for display with an indication that the second panoramic image is available and determining a zoom level for the second panoramic image based on the first 3D geometry data, the first multi-dimensional location information, the second 3D geometry data, and the second multi-dimensional location information. The method also includes providing the second panoramic image for display with the zoom level for the second panoramic image.

In one example, the method also includes receiving view port information identifying a viewing angle of a display of the first panoramic image and a zoom level of the display of the first panoramic image. In this example, determining the zoom level for the second panoramic image also includes identifying a first distance to a three dimensional point on a surface of an object in the viewing angle of the display of the first panoramic image based on the first 3D geometry data, the first multi-dimensional location information, and the zoom level of the display of the first panoramic image; identifying a second distance to the three dimensional point on the surface of the object in the second panoramic image based on the first location information and the second 3D geometry data; and determining the zoom level for the second panoramic image using at least the first distance and the second distance. In addition, determining the zoom level for the second panoramic image is further based on a ratio of the first distance to the second distance. Also, the second distance is a linear distance between the three dimensional point and the second location information. In other such examples, when the zoom level of the display of the first panoramic image indicates that the first panoramic is not zoomed in, the first distance is a linear distance between the first location of the first panoramic image and the three dimensional point on the surface of the object in the viewing angle of the display of the first panoramic image. In another example, the view port information further identifies a viewing angle of a display of the first panoramic image, and the method also includes determining a viewing angle of the second panoramic image based on the viewing angle and the viewing angle for the second panoramic image is provided with the second panoramic image.

BRIEF DESCRIPTION OF THE DRAWINGS

FIG. 9 is a flow diagram in accordance with aspects of the disclosure.

DETAILED DESCRIPTION

Overview

Figure 1:
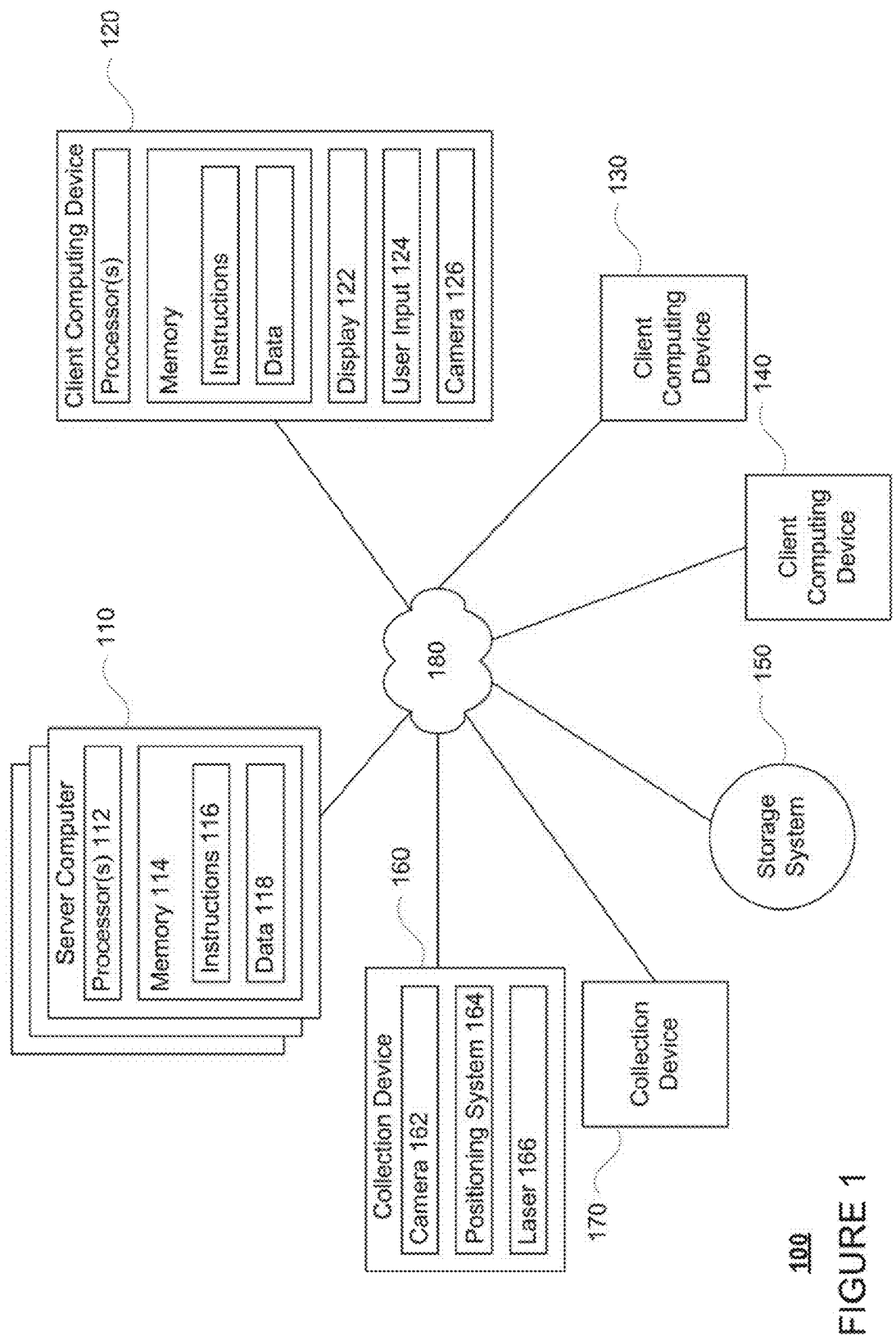
FIG. 1 is a functional diagram of an example system in accordance with aspects of the disclosure.

The technology relates to selecting and displaying panoramic images captured at different points in time. As an example, a user of a computing device (e.g., a smart phone, laptop, or other personal computing device) may view a street level panoramic image oriented in a particular direction. The computing device may display a "view port" or a portion of the panoramic image that includes various objects that appear to be at a particular distance from the user. The user may also want to view another panoramic image of those objects that was captured at a different point in time. From the user's perspective, he or she may select an option to switch to another panoramic image captured at a different point in time. In response, the user experiences a smooth transition from one panoramic image to another captured at a different point in time which feels like to the user was taken from the same position as the view port of the original panoramic image.

In order to provide the user with another panoramic image as described above, a plurality of such street level panoramic images may be accessed. Each of these panoramic images may have been captured by a camera device mounted on a vehicle as the vehicle is driven along a street. In other examples, the panoramic images may be collected by a person using a camera rig attached to a backpack (e.g., for paths and other non-street areas), a smartphone camera, camera, etc. As the panoramic image is captured, the camera device, or another device, may identify and associate location and orientation information corresponding to a two or three dimensional (2D or 3D) location of the panoramic image. This location and orientation information may also be processed to reduce noise in the raw data. This processed (or unprocessed) location and orientation information may be referred to as the "actual" location of the panoramic image.

In addition to the image and actual location, each panoramic image may also be associated with 3D geometry data corresponding to points on the surface of any objects in that panoramic image. For example, as a vehicle is driven along the street, a LIDAR system may be used to collect laser data or light intensity information which is converted into three dimensional points on the surface of objects. These objects will correspond to objects that are included in a panoramic image that was captured at approximately the same location as the laser data.

Each panoramic image may be processed in order to identify a second location for that image. This second location may correspond to a location along a line through the center or nearly the center of the street along which the vehicle was driven or a "snap" location. This snap location may be defined in a single dimension (1D) along the line through the center of the street.

For a first panoramic image, nearby panoramic images captured at a different point in time, for example on one or more different collection dates, may be selected by querying a plurality of images to identify an image that was both captured at the different point(s) in time and has a snap location that is closest to the snap location of the first panoramic image. Here, the different point in time refers to two different passes near the location of the given panoramic image.

Once a second panoramic image is selected, a link between the first panoramic image and the second panoramic image may be established. Thus, when a user views the first panoramic image, he or she may be provided with an option to view, for example in a thumbnail view, the second panoramic image in conjunction with the first panoramic image or to switch to a view of the second panoramic image. In this example, the second panoramic image may be selected in advance, that is before the user has requested to view the first panoramic image. Alternatively, the selection may be performed in real time (e.g., without delay and in response to the request to view the first panoramic image) in order to keep the closest available panoramic images up to date as the plurality of panoramic images may change over time as additional images are collected.

The view port of the first panoramic image may be used to determine how to display the second panoramic image. For example, the displayed orientation of the view port of the second panoramic image may be selected in order to correspond to the orientation of the view port of the second panoramic image. In addition, the three dimensional geometry data associated with the first panoramic image may be used to determine the distance between the point of view of the view port and an object. For instance, where there is no zoom, the point of view would be the actual location of the first panoramic image. This distance and the three dimensional geometry data associated with the second image are then used to adjust the zoom of the second panoramic image when the second panoramic image is displayed. In this regard, the second panoramic image may be displayed such that objects in the second panoramic image will appear to be the same distance from the user as those same objects in the view port of the first panoramic image.

The features described above simplify the selection and display of other panoramic images from different points in time. For example, it is significantly more efficient to search for images in a single direction using a snap location than using an actual two or three dimensional location. In addition, if the second panoramic image was displayed from the view point at which the second panoramic image was captured, if the images were captured at different sides of the road, switching to the second panorama could be fairly jarring to the user.

Example Systems

Figure 2:
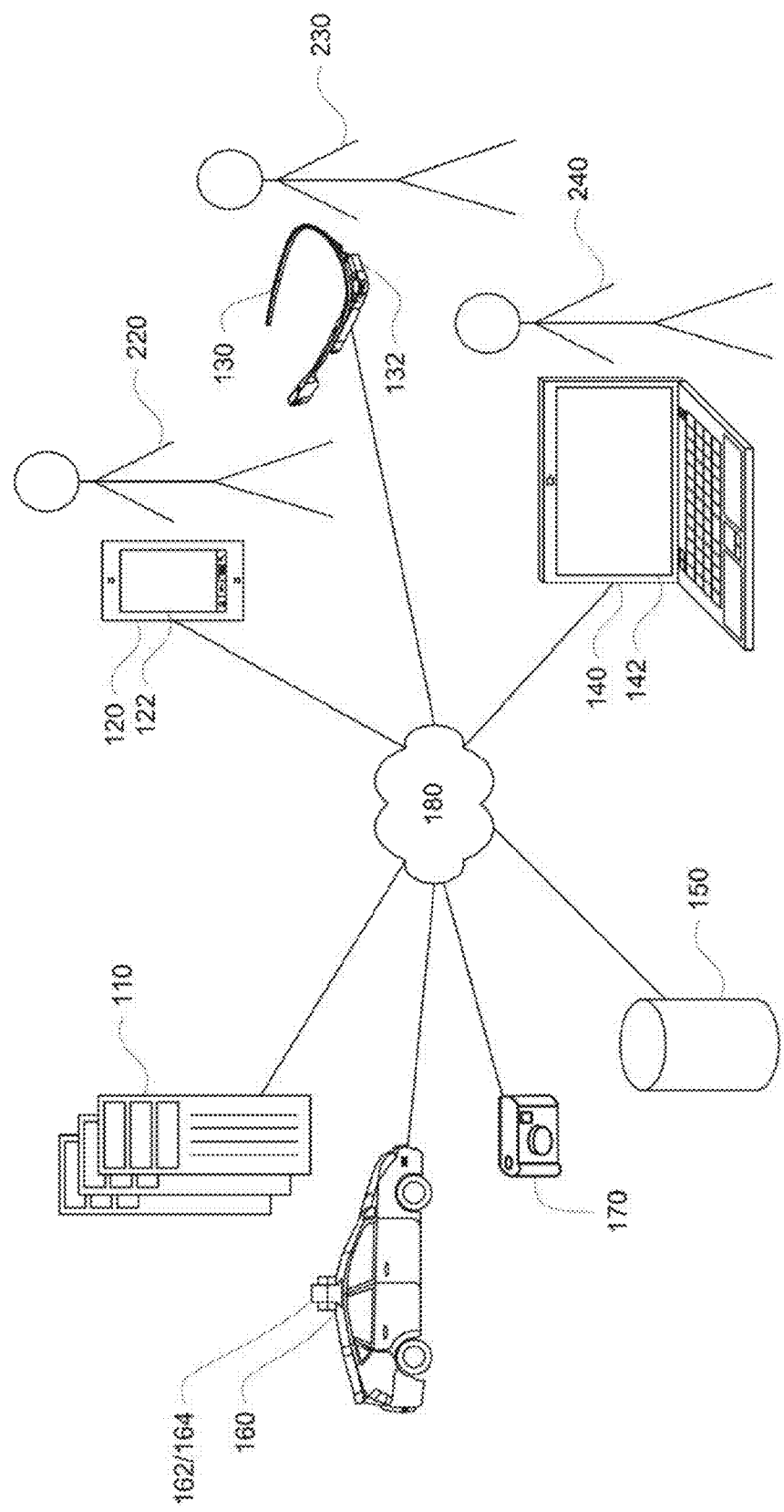
FIG. 2 is a pictorial diagram of the example system of FIG. 1.

FIGS. 1 and 2 include an example system 100 in which the features described herein may be implemented. It should not be considered as limiting the scope of the disclosure or usefulness of the features described herein. In this example, system 100 can include one or more computing devices 110, 120, 130, and 140, storage system 150, as well as collection devices 160 and 170. One or more computing devices 110 can contain one or more processors 112, memory 114 and other components typically present in general purpose computing devices. Memory 114 of the one or more computing devices 110 can store information accessible by one or more processors 112, including instructions 116 that can be executed by the one or more processors 112.

Memory can also include data 118 that can be retrieved, manipulated or stored by the processor. The memory can be of any non-transitory type capable of storing information accessible by the processor, such as a hard-drive, memory card, ROM, RAM, DVD, CD-ROM, write-capable, and read-only memories.

The instructions 116 can be any set of instructions to be executed directly, such as machine code, or indirectly, such as scripts, by the processor. In that regard, the terms "instructions," "application," "steps" and "programs" can be used interchangeably herein. The instructions can be stored in object code format for direct processing by the processor, or in any other computing device language including scripts or collections of independent source code modules that are interpreted on demand or compiled in advance. Functions, methods and routines of the instructions are explained in more detail below.

Data 118 can be retrieved, stored or modified by processor 112 in accordance with the instructions 116. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 112 can include any conventional processors, such as a commercially available CPU. Alternatively, the processor can be a dedicated component such as an ASIC or other hardware-based processor. Although not necessary, one or more computing devices 110 may include specialized hardware components to perform specific computing processes, such as decoding video, matching video frames with images, distorting videos, encoding distorted videos, etc. faster or more efficiently.

Although FIG. 1 functionally illustrates the processor, memory, and other elements of computing device 110 as being within the same block, the processor, computer, computing device, or memory can actually comprise multiple processors, computers, computing devices, or memories that may or may not be stored within the same physical housing. For example, the memory can be a hard drive or other storage media located in one or more housings different from those of the one or more computing devices 110. Accordingly, references to a processor, computer, computing device, or memory will be understood to include references to a collection of processors, computers, computing devices, or memories that may or may not operate in parallel. For example, the computing devices 110 may include server computing devices operating as a load-balanced server farm. Yet further, although some functions described below are indicated as taking place on a single computing device having a single processor, various aspects of the subject matter described herein can be implemented by a plurality of computing devices, for example, communicating information over network 180.

The one or more computing devices 110 can be at various nodes of a network 180 and capable of directly and indirectly communicating with other nodes of network 180. Although only a few computing devices are depicted in FIGS. 1-2, it should be appreciated that a typical system can include a large number of connected computing devices, with each different computing device (as well as collection device) being at a different node of the network 180. The network 180 and intervening nodes described herein can be interconnected using various protocols and systems, such that the network can be part of the Internet, World Wide Web, specific intranets, wide area networks, or local networks. The network can utilize standard communications protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

As an example, the one or more computing devices 110 may include one or more web servers that are capable of communicating with storage system 150 as well as computing devices 120, 130, and 140 via the network. For example, one or more server computing devices 110 may use network 180 to transmit and present information to a user, such as user 220, 230, or 240, on a display, such as displays 122, 132, or 142 of computing devices 120, 130, or 140. In this regard, computing devices 120, 130, and 140 may be considered client computing devices and may perform all or some of the features described below.

Each of the client computing devices may be configured similarly to the server computing devices 110, with one or more processors, memory and instructions as described above. Each client computing device 120, 130 or 140 may be a personal computing device intended for use by a user 220, 250, 250, and have all of the components normally used in connection with a personal computing device such as a central processing unit (CPU), memory (e.g., RAM and internal hard drives) storing data and instructions, a display such as displays 122, 132, or 142 (e.g., a monitor having a screen, a touch-screen, a projector, a television, or other device that is operable to display information), and user input device 124 (e.g., a mouse, keyboard, touch-screen or microphone). The client computing device may also include a camera for recording video streams, speakers, a network interface device, and all of the components used for connecting these elements to one another.

Although the client computing devices 120, 130 and 140 may each comprise a full-sized personal computing device, they may alternatively comprise mobile computing devices capable of wirelessly exchanging data with a server over a network such as the Internet. By way of example only, client computing device 120 may be a mobile phone or a device such as a wireless-enabled PDA, a tablet PC, or a netbook that is capable of obtaining information via the Internet. In another example, client computing device 130 may be a head-mounted computing system. As an example the user may input information using a small keyboard, a keypad, microphone, using visual signals with a camera, or a touch screen.

Storage system 150 may store various types of information. As described in more detail below, the storage system 150 may store images, such as those described above as having a field of view which is greater than that of the human eye, e.g., 180 degrees or greater. In that regard, example panoramic images described herein provide a 360-degree view of a location, though other types of images may also be used. In addition, each panoramic image may be associated with geographic location information indicating the location and, in some cases, the orientation at which the panoramic image was captured (e.g., which part of the panoramic image is oriented towards "North", etc.) as well as timestamp information indicating the date and time at which the panoramic image was captured.

The storage system 150 may also store 3D geometry data. As explained above and described in more detail below, this 3D geometry data may correspond to points on the surface of any objects in the plurality of panoramic image. The 3D geometry data may provide the position (x,y,z) of points relative to a particular coordinate system (e.g. relative to a position of a LIDAR system that generated the geometry data or a global positioning system (GPS) such as latitude, longitude, and altitude coordinates).

Storage system 150 may also store map information. The map information may be an image based map or may include a plurality of vectors used to identify the shape, orientation, and other characteristics of streets used to display a map. In this regard, the streets may be divided into discrete road segments. As an example, collection of such road segments (or vectors) may be used to display a map.

As with memory 114, storage system 150 can be of any type of computerized storage capable of storing information accessible by server 110, such as a hard-drive, memory card, ROM, RAM, DVD, CD-ROM, write-capable, and read-only memories. In addition, storage system 150 may include a distributed storage system where data is stored on a plurality of different storage devices which may be physically located at the same or different geographic locations. Storage system 150 may be connected to the computing devices via the network 180 as shown in FIG. 1 and/or may be directly connected to or incorporated into any of the computing devices 110-140 (not shown).

Collection devices 160 and 170 may include a computing device, configured similarly to one of the server computing devices or client computing devices with a processor and memory storing data and instructions (not shown in FIG. 1 for simplicity). Collection devise 160 and 170 may also provide all or some of the images of storage system 150. Each of the collection devices 160 and 170 may include a camera or other information collection device. For example, collection device 160 may include a camera 162 mounted on a vehicle. As the vehicle is driven along a street, the camera of collection device 160 may capture panoramic images. In this regard, all or some of the panoramic images of storage system 150 may be considered "street level images." As another example, collection device 170 may include a camera rig attached to a backpack (e.g., for paths and other non-street areas), a smartphone camera, a dedicated camera device, etc. which a person walks, bikes, or otherwise moves around with in order to capture panoramic images. In addition to capturing images, the collection devices and/or camera may be configured to provide each panoramic image with a timestamp indicating the date and time at which the image was captured. The captured panoramic images and timestamps may be uploaded or downloaded to the storage system 150.

Each of collection devices 160 or 170 may include a position system 164 in order to determine the camera's relative or absolute position on a map or on the Earth when an image is captured. For example, the position system 164 may include a GPS receiver to determine the device's latitude, longitude and/or altitude position and provide a two or three dimensional (2D or 3D) location at which each panoramic image was captured by the collection device. Other location systems such as laser-based localization systems, inertial-aided GPS, trilateration/triangulation, or camera-based localization may also be used to identify the location of the vehicle. The location of the vehicle may include an absolute geographical location, such as latitude, longitude, and altitude as well as relative location information, such as location relative to other cars immediately around it which can often be determined with less noise than an absolute geographical location.

The positioning system 164 may also include other devices in communication with the camera or collection device, such as an accelerometer, gyroscope or another direction/speed detection device to determine the orientation of the camera 162 when the panoramic image was captured. By way of example only, an acceleration device may determine its pitch, yaw or roll (or changes thereto) relative to the direction of gravity or a plane perpendicular thereto. The device may also track increases or decreases in speed and the direction of such changes.

The collection device's provision of location and orientation data as set forth herein may be associated with the panoramic images as they are being captured and provided automatically to the storage system 150, other computing devices and combinations of the foregoing. Although camera 162 and position system 164 are depicted within the collection device 160, these components may or may not be included in the same physical housing. In this regard, the position system 164 may be a different device from the camera 162 such that both components output the 2D or 3D location information and orientation information and panoramic images to the collection device which processes these outputs in order to associate them with one another and provide them to the storage system 150.

In some examples, the collection device 160 may include a LIDAR system 166 for generating the 3D geometry data described above. For example, as a vehicle is driven along the street, a LIDAR system may be used to collect laser data or light intensity information which is converted into three dimensional points on the surface of objects. These objects will correspond to objects that are included in a panoramic image that was captured by a camera, such as camera 162, at approximately the same geographic location as the laser data.

Example Methods

In order to provide a user with images, a first plurality of panoramic images (at least some of which are street level images) may be captured and stored. As noted above, these images may be captured by a camera mounted on a vehicle (or other device). In this regard, panoramic images may be captured in a sequence as the camera is moved along. Each panoramic image may be associated with 2D or 3D location and orientation information corresponding to the geographic location where the panoramic image was captured as well as a timestamp indicating the date and time when the image was captured. For example, as a collection device such as collection device 160 is moved around, such as by driving a vehicle along a street, camera 162 may capture panoramic images. At the same time, the position system 164 may provide GPS coordinates for each panoramic image captured by camera 162. Each time the collection device 160 captures a series of images may be considered a separate "run."

Figure 3A:
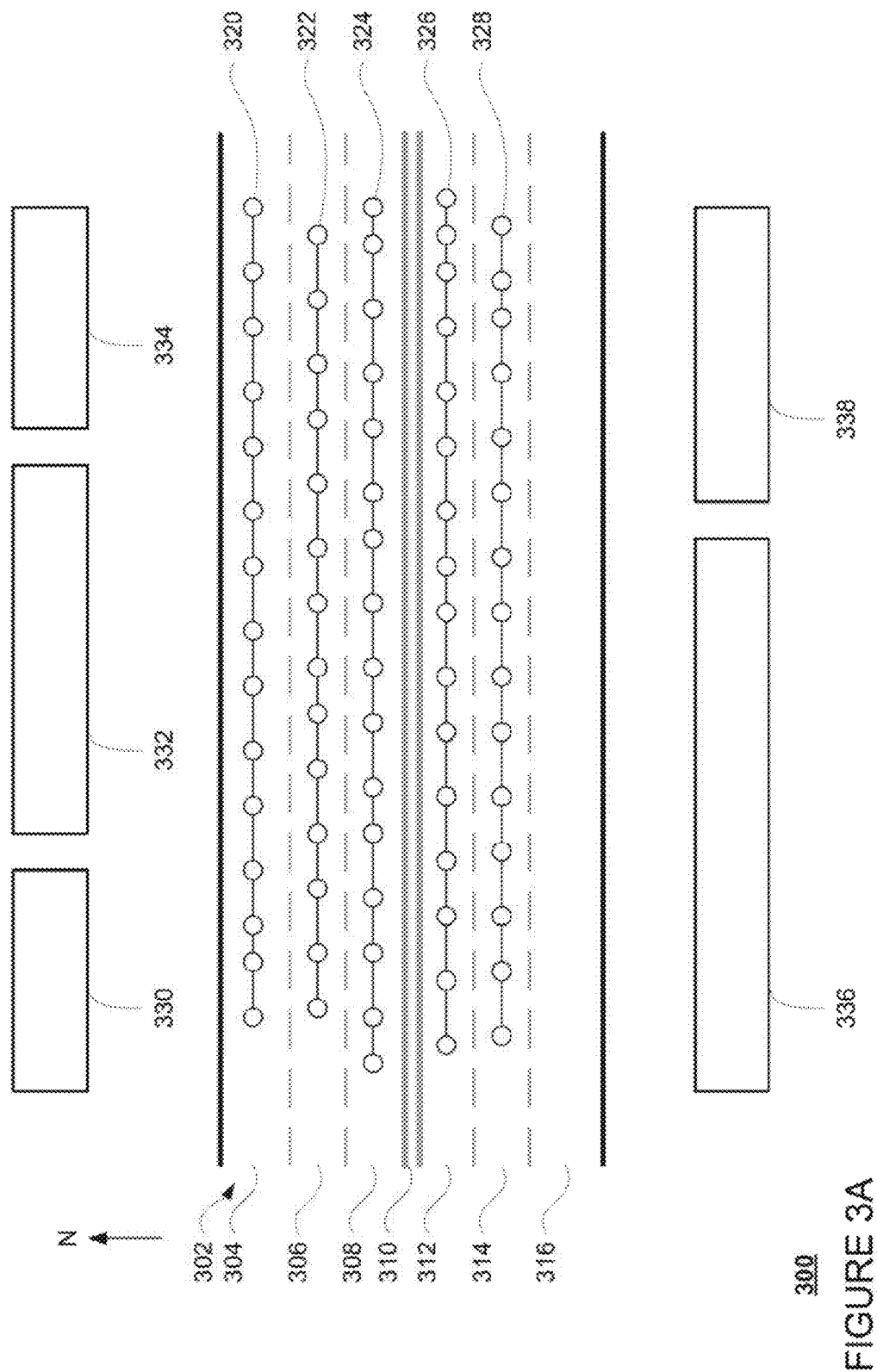
FIG. 3A is an example diagram of image collection locations in accordance with aspects of the disclosure.

FIG. 3A is an example diagram 300 of a birds-eye view of a portion of a street 302 including six lanes 304, 306, 308, 312, 314, and 316. The six lanes are divided into two sections by double lane lines 310. Those appearing above double lane lines 310 are westbound lanes, while those below are eastbound. In this example, the circles correspond to the 2D locations (x,y) of street level images. These circles are arranged into five different runs 320-328. Again, each run may correspond to a path taken by a collection device as the panoramic images of that run were captured. In this example, runes 320, 322, and 324 appear in the westbound lanes 304, 306, and 308, while runs 326 and 328 appear in the eastbound lanes 312 and 314 (but not 316). Here, the street level panoramic images of run 320 were collected by camera 162 of collection device 160 as the vehicle was driven along lane 304 of street 302. The panoramic images of runs 322-328 may have been collected by the same or a different collection device, but were each collected on different dates and times from one another. In the example of FIG. 3A, different runs occur in different lanes for clarity, but this does not necessarily need to be the case. Multiple runs (e.g., 320, 322) could appear in the same lane (e.g., 306).

As the panoramic images are collected during the different runs, 3D geometry data corresponding to objects in those images may also be collected. For example, as collection device 160 is driven along the street 302, LIDAR system 166 may be used to collect laser data or light intensity information corresponding to the surfaces of buildings 330-338. As noted above, this information is converted into three dimensional points on the surface of those buildings. Thus, this information may describe objects that are included in the panoramic image that was captured at approximately the same location as the laser data, or rather any of the panoramic images of runs 320-328. Though not required, each run may be associated with its own 3D geometry data. This 3D geometry data may be associated with individual street level panoramic images or runs, or the 3D geometry data may be retrieved using the 2D or 3D location information for a panoramic image.

Figure 3B:
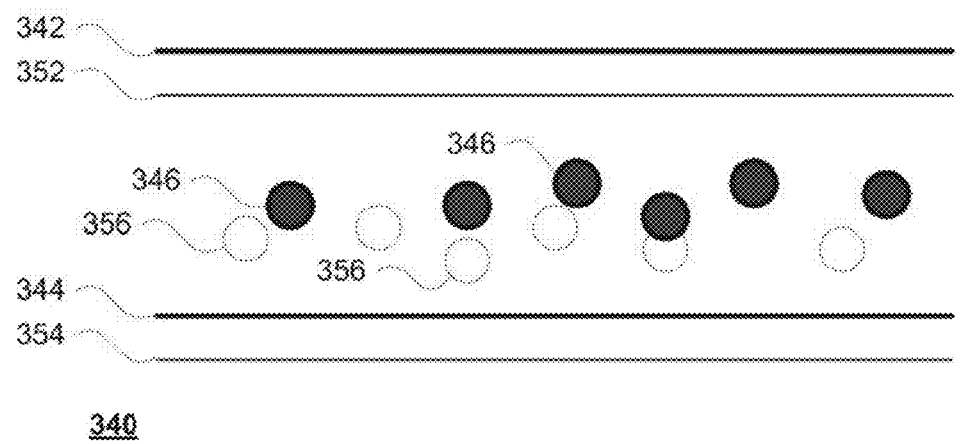
FIG. 3B is an example diagram of data in accordance with aspects of the disclosure.
Figure 3C:
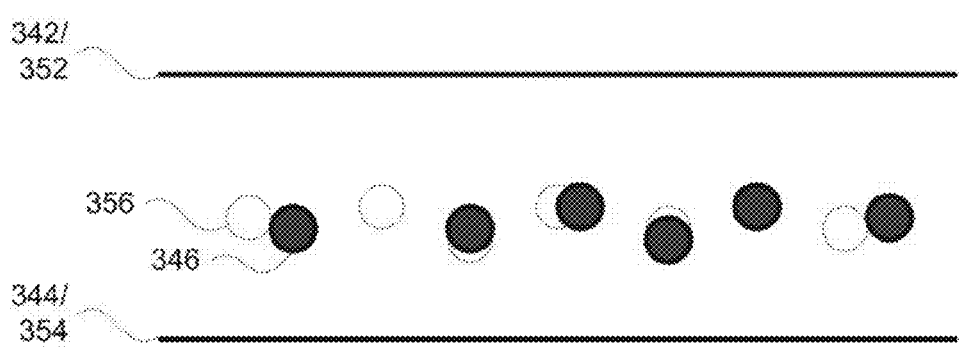
FIG. 3C is another example diagram of data locations in accordance with aspects of the disclosure.

In some instances, because of the noise inherent in the GPS coordinates, this information may also be processed in order to reduce noise in the raw data. For example, the laser data, for example generated by a LIDAR system, may be used to shift, confirm, or otherwise correct the GPS coordinates. Example 340 of FIG. 3B depicts two different runs through the same area (e.g., along the same portion of roadway, but not necessarily in the same lane of traffic). The first run includes 3D geometry data corresponding to the façades of buildings represented by lines 342 and 344. The first run also include a plurality of GPS coordinates shown as open circles 346. The second run includes 3D geometry data corresponding to the façades of buildings represented by lines 352 and 345. The second run also include a plurality of GPS coordinates shown as solid circles 356. Data from these two runs may then be shifted relative to one another as shown in example 350 of FIG. 3C. Here, the lines 342 and 344 and/or lines 352 and 354 are shifted so that they align with one another. In addition, the GPS coordinates of each shifted run may also be shifted so that they remain the same relative distance from the lines corresponding to the 3D geometry data for that shifted run. This processed (or in some examples, unprocessed) location and orientation information may be referred to as the "actual" location of the panoramic image.

Each panoramic image may also be processed in order to identify another location for that image which can be represented in one dimension (1D). For example, this second location may correspond to a location along a line through the center or nearly the center of the street along which the vehicle was driven or a "snap" location. The line may correspond to a road segment of the map information stored in storage system 150. In other words, the 2D or 3D location of an image is snapped to a 1D location on the road segment. In this regard, the snap location may be defined in a single dimension along the road segment or rather the line through the street.

Typically, the snap location of an image may be determined by identifying the location of a closest road segment in the map to the 2D or 3D location of a panoramic image. Where the map information has more complex arrangements of road segments (e.g., such as where the closest road segment may actually correspond to a different street), the snap location of an image may be determined based on the most likely snapped position of other images that were captured in that same run. In this regard, even if a single image is closer to a first road segment, it may be snapped to a different road segment if the images captured in the run before and/or after that image were all snapped to the different road segment.

Figure 4:
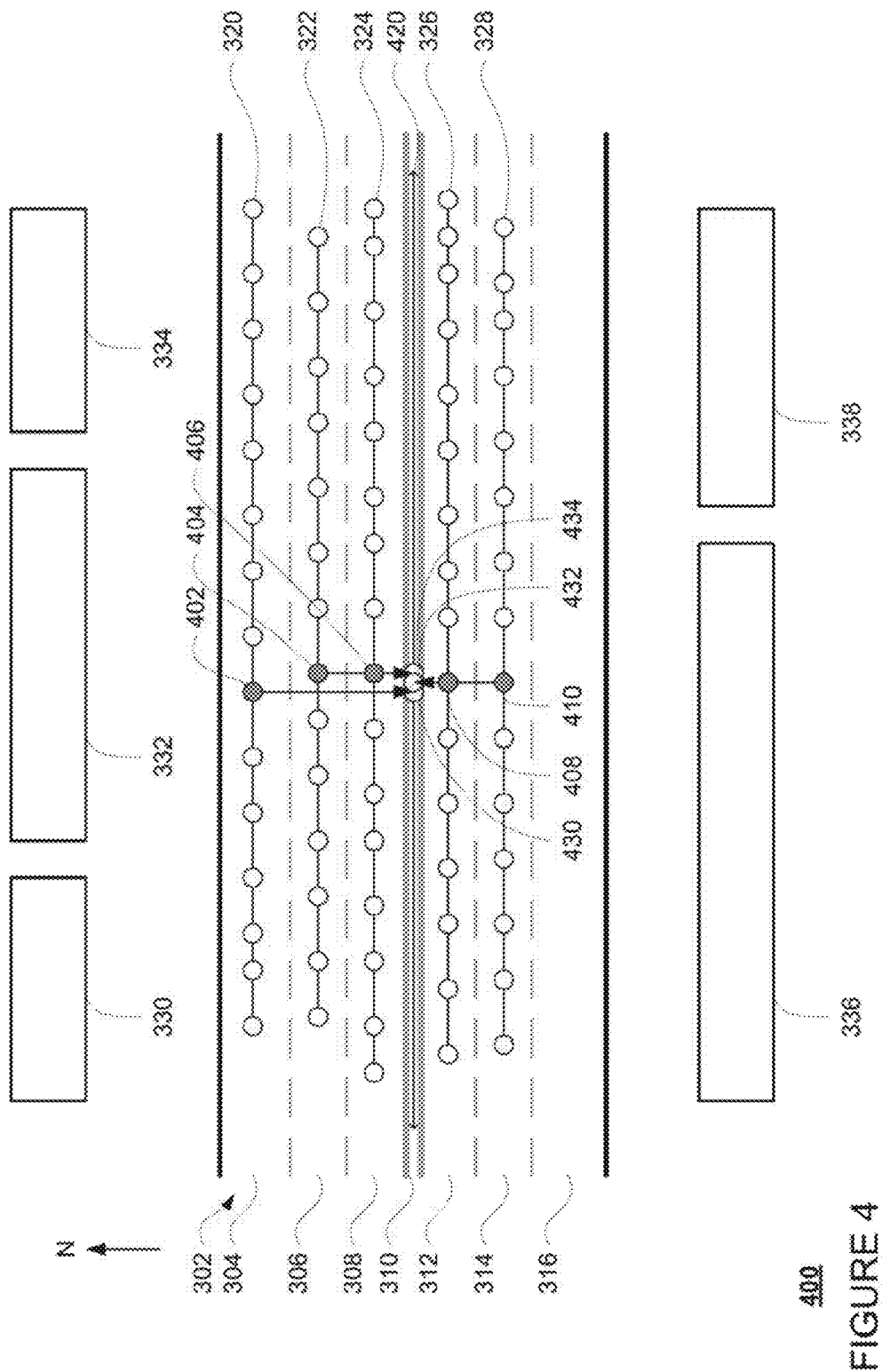
FIG. 4 is an example diagram of repositioning some of the collection locations of FIG. 3A in one dimension in accordance with aspects of the disclosure.

FIG. 4 is an example diagram 400 which depicts the snapping of a small number of images of the runs of FIG. 3A to a road segment 420 corresponding to a portion of street 302. In this example, panoramic images 402-410 of runs 320-328, respectively, are snapped to the closest location along road segment 420, or locations 430-434. In this regard, a 1D location corresponding to the positions of location 430-434 along road segment 420 is identified for each of panoramic images 402-410. The other images of the runs 320-328 may also each be snapped to road segment 420 in order to identify a 1D location for those panoramic images as well.

The 1D snap locations identified as discussed above may be used by the one or more server computing devices to select one or more panoramic images that was captured at approximately the same location but at different points in time. Here, a different point in time refers to two different runs near the location of a given panoramic image. In this regard, given a 1D snap location of a first panoramic image, other panoramic images of the storage system 150 may be queried by the one or more server computing devices 110 in order to identify a second panoramic image having a 1D snap location that is both closest to the 1D snap location of the first panoramic image and has a timestamp which indicates that the second image was captured on a different day (e.g., during a different run) than the first panoramic image. In some instances if the closest panoramic image for a different run is greater than a specified distance, for example, 15 meters or more or less, than no second panoramic images may be selected for that run.

If there are multiple other runs for a given road segment, (e.g., one in August 2011, one in September 2012, etc.), the panoramic images associated with such runs (as identified by the timestamps) may be queried in groups such that a closest panoramic image along the road segment may be identified for each individual run. In this regard, a plurality of such second images, one for each run, may be selected based on a particular first image. Returning to the example of FIG. 4, if panoramic image 402 is a first panoramic image, a second panoramic image may be identified for each of runs 322-328 as each of these runs were each collected on different dates and times from one another, and also from run 320 during which panoramic image 402 was captured. Each of panoramic images 402, 406, 408, 410, and 412 may be selected as a second panoramic image for panoramic image 402 as they would have the closes 1D snap locations for each respective run to the 1D snap location of panoramic image 402.

Any such second panoramic images may be provided for display to a user in conjunction with the first panoramic image. For example, a user, such as user 220, may make a request to view the first panoramic image using a client computing device, such as client computing device 120, by selecting an option to view the first panoramic image, by searching for the first panoramic image by entering a particular location into a search engine, selecting a point on a map corresponding to the 2D or 3D location of the first panoramic image, or in other conventional way. In response, the client computing device may send a request for or identify the first panoramic image to the one or more server computing devices 110.

The one or more server computing devices may receive the request to identify any second panoramic images for the first panoramic image. In one example, any selected second panoramic images described above may be associated with the first panoramic image such that the server computing device 110, may use the first panoramic image to retrieve any second panoramic images. Thus, any second panoramic images may be selected in advance by the one or more server computing devices, that is, before the user has requested to view the first panoramic image. Alternatively, the selection may be performed in real time (e.g., without delay and in response to the request for or identifying the first panoramic image) in order to keep the closest available panoramic images up to date. This may be especially useful as the plurality of panoramic images of the storage system 150 may change over time as additional images are collected.

Once identified, the one or more server computing devices may provide the first panoramic image as well as an option to view any of the identified second panoramic images for display. For instance, when a user views the first panoramic image, he or she may be provided with an option to view one or more second panoramic images in conjunction with the first panoramic image or to switch to a view of one of the second panoramic images. In some examples, any second panoramic images, although not immediately displayed may also be provided to the client computing device, before the user has selected the option, in order to allow the client computing device to display them more quickly.

Figure 5:
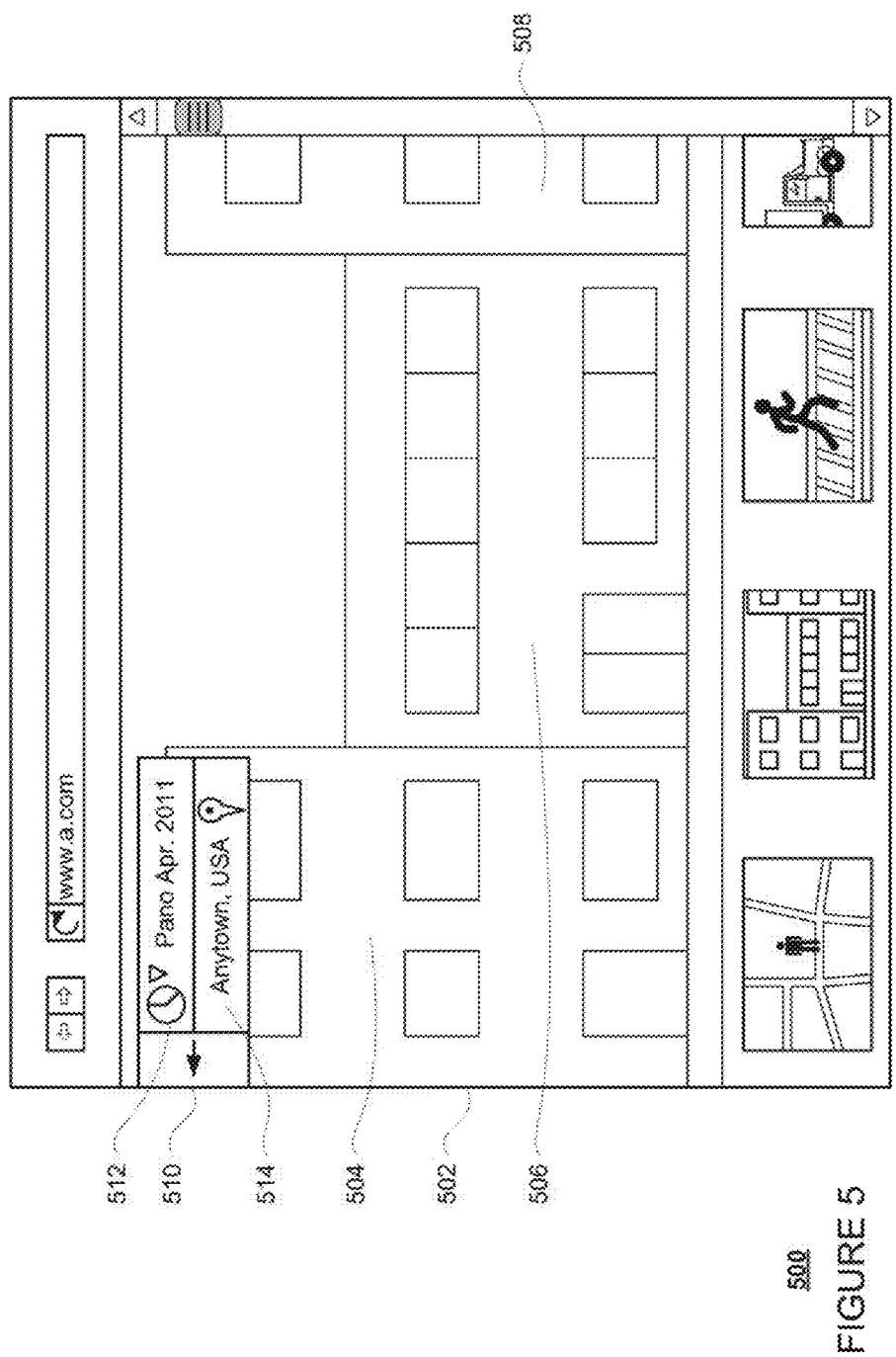
FIG. 5 is an example screen shot of a portion of a panoramic image in accordance with aspects of the disclosure.

FIG. 5 is an example screen shot 500 which may be displayed to a user, such as user 220, on a display of a client computing device, such as display 122 of client computing device 120. In this example, the screen shot 500 includes a display of a portion of the panoramic image 502, or a view port. This view port includes a particular orientation and zoom level which allows the user to view portions of buildings 504, 506, and 508. In this example, panoramic image 502 may be considered a first panoramic image as described above. The screen shot 500 also includes display box 510 which includes a first part with a clock icon 512 that indicates that a second panoramic image is available for the panoramic image 502. Display box 510 also includes other information such as location data 514 identifying an approximate location of the portion of the panoramic image 502.

Figure 6:
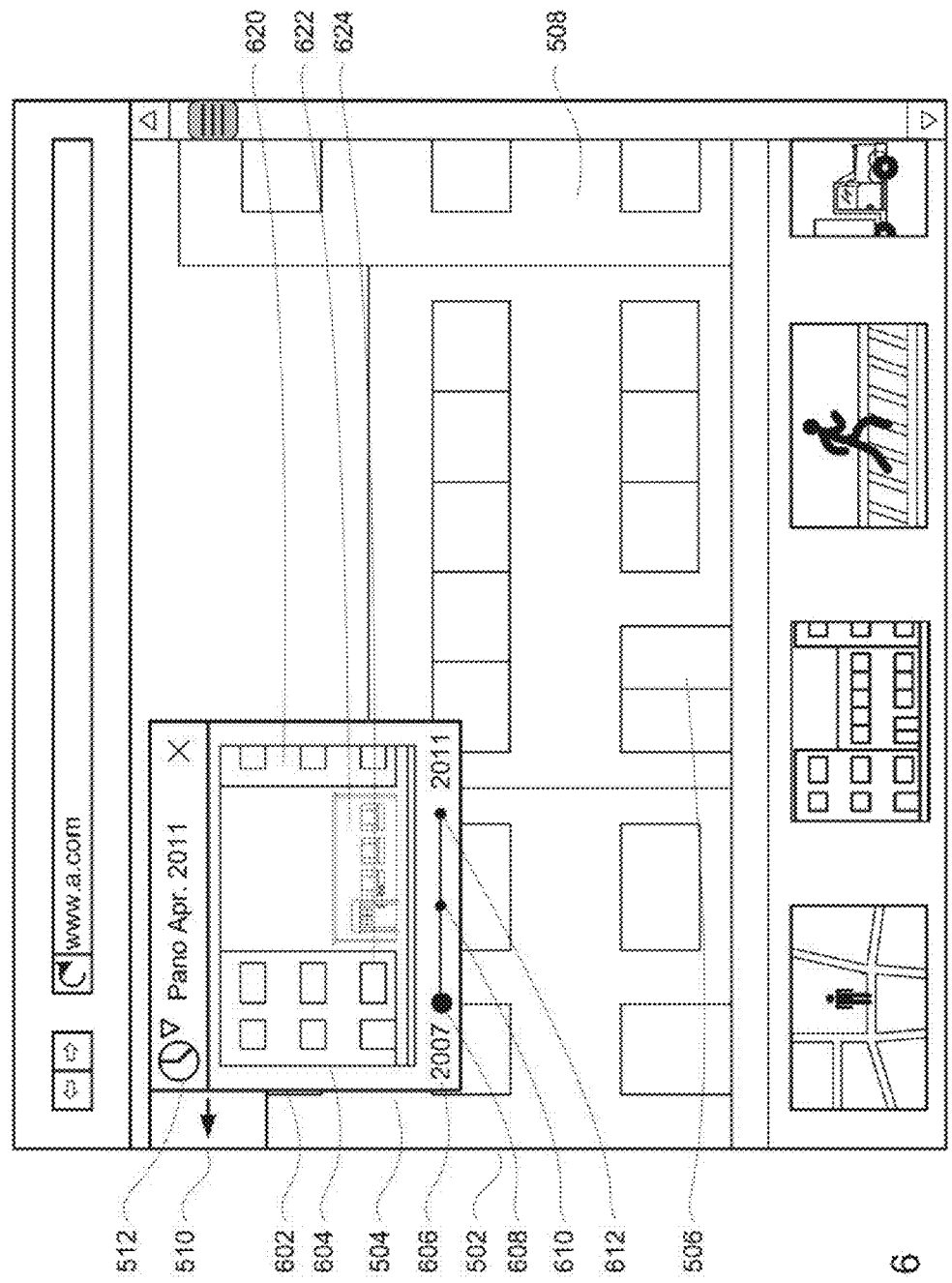
FIG. 6 is an example screen shot of a portion of a panoramic image and a thumbnail image in accordance with aspects of the disclosure.

By selecting the option to view a second panoramic image, the user may be provided with a display of a portion of a second panoramic image. For example, as shown in example screen shot 600 of FIG. 6, once a user has selected clock icon 512, the display box 510 changes to include a time window 602. Time window 602 includes a portion (e.g., a thumbnail image) of a second panoramic image 604 that was selected for panoramic image 502. In this example, the portion of panoramic image 604 includes buildings 620, 622, and 624. Here, buildings 624 and 620 may correspond to buildings 504 and 508, respectively of panoramic image 502. However, building 622 does not correspond to building 510, as in this example building 622 did not exist at the time that panoramic image 502 was captured. Rather, at the time panoramic image 502 was captured, building 622 was replaced by building 510.

Time window 602 also includes a slider bar 606 or other selection arrangements which provides a number of different functions. In this example, slider bar 606 indicates the quantity of available second panoramic images for the panoramic image 502. As there are three points 608, 610, and 612 on the slider bar, this may indicate that there are panoramic images from at least two different runs or dates in time that correspond to the location of panoramic image 502. For example, point 608, as it is slightly larger than points 610 and 612, may indicate that panoramic image 604 was captured in 2007 and, assuming that the user was viewing the most recent panoramic image, point 612 may indicate that panoramic image 502 was captured in 2011. Point 610 may further indicate that another image, captured sometime between 2007 and 2011 is also available for viewing by the user. Thus, my manipulating the slider bar, the user may view other available panoramic images, including the panoramic image corresponding to point 610 as well as panoramic image 502 (corresponding to point 612) in the time window. Of course, other slider bars may include fewer points than available panoramic images such that locations along the slider bar between points may also correspond to available panoramic images, and other such mechanisms may be used to indicate to the user that second panoramic images are available.

As noted above, the user may also switch between the second panoramic images and the first panoramic image. For example, a user may simply select the panoramic image displayed in the time window 602 or one of the points of slider bar 606 using mouse pointer, finger and touchscreen. In response, the client computing device may transition from a display of the first panoramic image to a display of the selected second panoramic image. In between, if needed, the client computing device may request the second paranoiac image from the one or more server computing devices as well.

Figure 7:
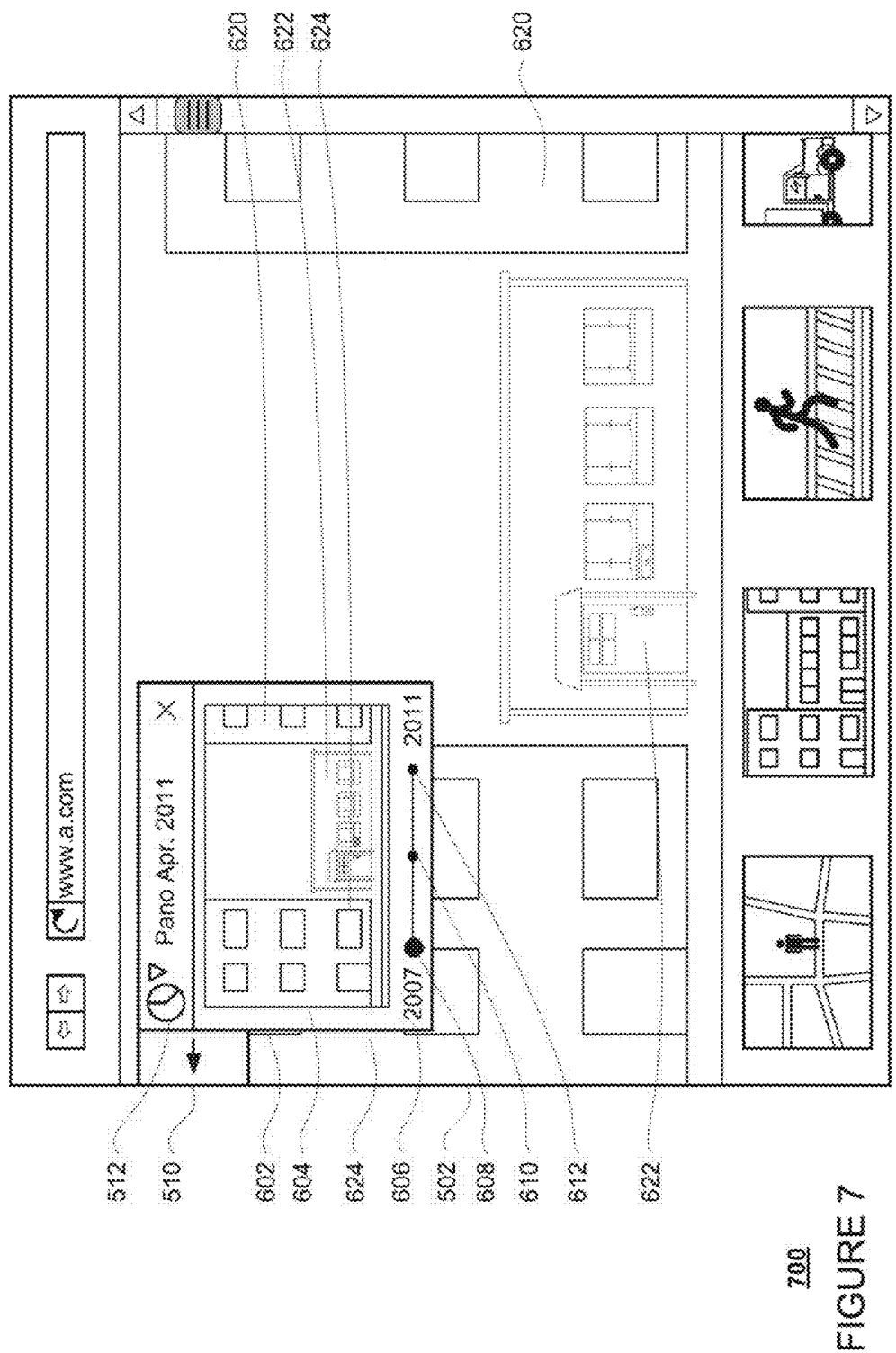
FIG. 7 is another example screen shot of a portion of a panoramic image and a thumbnail image in accordance with aspects of the disclosure.

As shown in the example screen shot 700 of FIG. 7, user 220 may select the panoramic image 604 and the display of the portion of panoramic image 502 transitions to, for example by simply switching or fading or by using some other transition mechanism, a display of the panoramic image 604.

The orientation and zoom level, or view port information, of the first panoramic image may be used to determine how to display the second panoramic image. For example, the displayed orientation of the second panoramic image may be selected in order to correspond to that of the first panoramic image. In addition, the three dimensional geometry data associated with the first panoramic image may be used to determine the distance between the point of view of the view port (e.g., where there is no zoom, the point of view would be the actual location of the first panoramic image) to an object. This distance and the three dimensional geometry data associated with the second image are then used to adjust the zoom of the second panoramic image when the second panoramic image is displayed. In this regard, the second panoramic image may be displayed such that objects in the second panoramic image will appear to be the same distance from the user as those same objects in the view port of the first panoramic image. For example, as can be seen from screen shot 600 of FIG. 6, the displayed portion of panoramic image 502 corresponds to the displayed portion of panoramic image 604. In this regard, both the orientations of the panoramic images are corresponding as well as the zoom levels, even though they are not necessarily the same.

Figure 8:
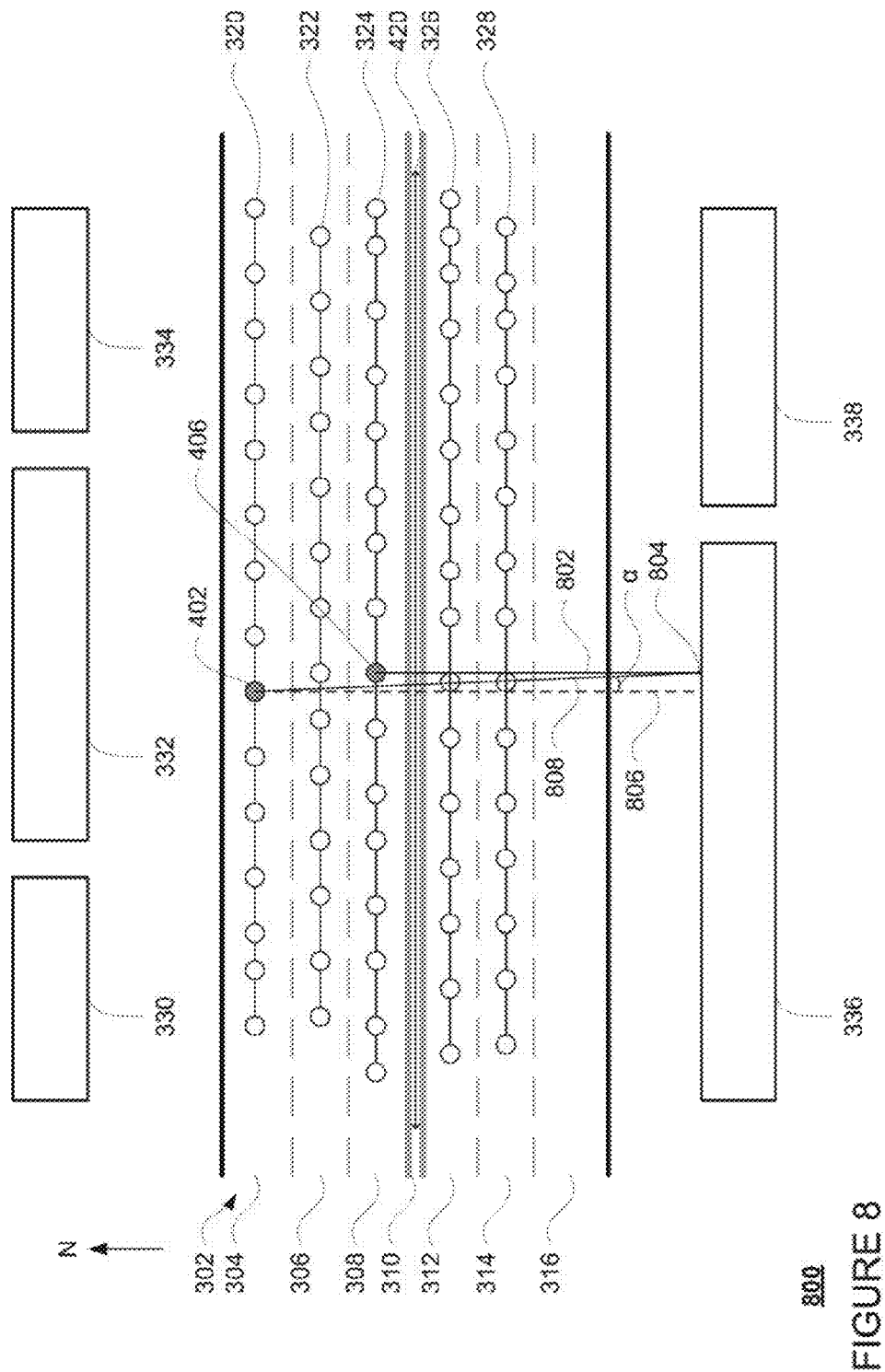
FIG. 8 is an example diagram of determining corresponding orientations and zoom levels in accordance with aspects of the disclosure.

For example, two corresponding orientations may either be identical or may be slightly different depending on the 2D or 3D location of each panoramic image. Referring to the example diagram 800 of FIG. 8, a user may be viewing panoramic image 406 oriented in a direction corresponding to South or some particular degree (e.g., 180 degrees from North, etc.) along line 802 at some zoom level z. Thus, the view port information for the panoramic image 406 in this example would include the orientation South and zoom level z. In this regard, the center point (or pixel) of the portion of panoramic image 406 that is displayed corresponds to the location of three dimensional point 804 on building 336.

If panoramic image 402 is available as a second panoramic image, a corresponding orientation may be selected by using the same orientation or south along dashed line 806. Alternatively, the orientation may be selected such that the center point (or pixel) of the portion of panoramic image 406 that is displayed corresponds to the three dimensional point 804 on building 336. This may be determined, for example, by using the 3D geometry data collected during each of runs 320 and 324 to identify the 3D location of point 804 as well as the 2D or 3D locations of panoramic images 402 and 406 to determine the angle α between dashed line 806 and solid line 808. The orientation of panoramic image 406 may then be adjusted using the angle α in order to determine a corresponding orientation for panoramic image 402. For example, as he the dashed line 806 is oriented clockwise from the solid line 808 if the orientation H of panoramic image 406 is in degrees and a is in degrees, α may be subtracted from H (or be made a negative value and added to H) to provide the orientation for panoramic image 402. As another example, if the dashed line 806 were oriented counterclockwise from the solid line 808, a may be made negative and subtracted from H (or be made added to H) to provide the orientation. If the orientation of the first panoramic image displayed to the user is expressed in two dimensions (e.g. a point on a sphere), the same or similar calculations may be performed in two dimensions to determine the orientation of the second panoramic image.

A corresponding zoom level for the second panoramic image may also be determined. For example, referring again to FIG. 8, the distance along line 802, D1, between the 2D or 3D location of panoramic image 406 and the 3D location of point 804 may be determined. Again, the center point (or pixel) of the portion of panoramic image 406 that is displayed corresponds to the location of three dimensional point 804 on building 336. Similarly, the distance along line 808, D2, between the 2D or 3D location of panoramic image 402 and the 3D location of point 804 may also be determined. A ratio of these two distances (D2/D1) may provide a zoom value. Applying this zoom value to the zoom level of the display of panoramic image 406, for example by multiplying (z*D2/D1) may provide a zoom level for panoramic image 402. In this regard if the zoom level of panoramic image 406 is 1, such that point 804 appears to be a distance D1 from the user, than the zoom level for panoramic image 406 would be D2/D1.

The corresponding orientation and zoom level may be determined by the one or more server computing devices or in real time by the client computing device. For example, the client computing device 120 may send the view port information to the one or more server computing devices when the user selects the option to view any second panoramic images (such as clock icon 512 of FIG. 5). In response, the one or more server computing devices 1120 may determine the corresponding view port information for the second panoramic image that will be displayed in the time window 602 as described above and send this information to the client computing device 120.

The corresponding orientation and zoom level, or corresponding view port information, may be used to display the second panoramic images. For example, referring back to FIG. 6, the displayed portion of panoramic image 502 corresponds to the displayed portion of panoramic image 604 even though they may not necessarily have (or been captured at) the same exact 2D or 3D location. In this regard, if the user changes the orientation of panoramic image 502, a corresponding change to the orientation of panoramic image 604 may be made in the time window 602. Thus, when the user selects to transition between the panoramic image 502 and 604 (as shown between FIGS. 6 and 7), the user experiences a smooth transition from one panoramic image to another captured at a different point in time which feels like to the user was taken from the same position as the view port of the original panoramic image.

Flow diagram 900 of FIG. 9 is an example of some of the features described above that may be performed by one or more computing devices, such as computing devices 110, described above. As shown in block 902 of this example, the one or more computing devices access a plurality of panoramic images. Each given panoramic image of the plurality of panoramic images is associated with multi-dimensional location information defined in at least two dimensions, uni-dimensional (1D) location information defined in only one dimension, three dimensional (3D) geometry data corresponding to a surface of an object depicted in the given panoramic image, and time information identifying when the given panoramic image was captured. At block 904, for a first panoramic image of the plurality of images, the first panoramic image being associated with first multi-dimensional location information, first 1D location information, and first time information, a second panoramic image of the plurality of panoramic images is selected. The second panoramic image panoramic image being associated with second multi-dimensional location information, second 1D location information, and second time information. The second panoramic image is selected such that the second 1D location information is closest to the first 1D location information and the first time information and second time information indicate that the first panoramic image and the second panoramic image were captured on different days. At block 906, first panoramic image is provided for display with an indication that the second panoramic image is available. At block 908, a zoom level for the second panoramic image is determined based on the first 3D geometry data, the first multi-dimensional location information, the second 3D geometry data, and the second multi-dimensional location information. The second panoramic image is provided for display with the zoom level for the second panoramic image at block 910.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A computer implemented method for selecting time-distributed panoramas for display, the method comprising:
   accessing, by one or more computing devices, a plurality of panoramic images, each panoramic image being associated with multi-dimensional location information defined in at least two dimensions, a one-dimensional (1D) snap location along a path at least partially traveled during image capture, three dimensional (3D) geometry data corresponding to a surface of an object depicted in the panoramic image, and time information identifying when the panoramic image was captured;
   for a first panoramic image of the plurality, querying the plurality of panoramic images and selecting, by the one or more computing devices, a second panoramic image of the plurality such that a second 1D snap location associated with the second panoramic image is closest to a first 1D snap location associated with the first panoramic image relative to 1D snap locations information associated with others of the plurality of panoramic images, at least a portion of a geographic area depicted in the first panoramic image is also depicted in the second panoramic image, and first time information associated with the first panoramic image and second time information associated with the second panoramic image indicate that the first panoramic image and the second panoramic image were captured on different days;

determining whether the second 1D snap location is within a threshold range of the first 1D snap location;

providing, by the one or more computing devices, the first panoramic image for display with an indication that the second panoramic image is available when the second 1D snap location is within the threshold range of the first 1D snap location;

determining, by the one or more computing devices, a zoom level for the second panoramic image based on first 3D geometry data and first multi-dimensional location information of the first panoramic image, and second 3D geometry data and second multi-dimensional location information of the second panoramic image, such that the zoom level for the second panoramic image is consistent with a zoom level of the first panoramic image; and providing, by the one or more computing devices, the second panoramic image for display with the zoom level for the second panoramic image.

2. The method of claim 1, further comprising:

receiving view port information identifying a viewing angle of a display of the first panoramic image and a zoom level of the display of the first panoramic image, wherein determining the zoom level for the second panoramic image further includes:

identifying a first distance to a three dimensional point on a surface of an object in the viewing angle of the display of the first panoramic image based on the first 3D geometry data, the first multi-dimensional location information, and the zoom level of the display of the first panoramic image;

identifying a second distance to the three dimensional point on the surface of the object in the second panoramic image based on the first location information and the second 3D geometry data; and determining the zoom level for the second panoramic image using at least the first distance and the second distance.

3. The method of claim 2, wherein determining the zoom level for the second panoramic image is further based on a ratio of the first distance to the second distance.

4. The method of claim 2, wherein the second distance is a linear distance between the three dimensional point and the second location information.

5. The method of claim 2, wherein when the zoom level of the display of the first panoramic image indicates that the first panoramic is not zoomed in, the first distance is a linear distance between the first location of the first panoramic image and the three dimensional point on the surface of the object in the viewing angle of the display of the first panoramic image.

6. The method of claim 2, wherein the view port information further identifies a viewing angle of a display of the first panoramic image, and the method further comprises:

determining a viewing angle of the second panoramic image based on the viewing angle; and the viewing angle for the second panoramic image is provided with the second panoramic image.

7. The method of claim 1, wherein the 1D snap location associated with each of the plurality of panoramic images is defined as a point on a line along a central portion of roadway.

8. The system of claim 2, wherein the 1D snap location associated with each particular panoramic image of the plurality of panoramic images is defined relative to a point on a line along a central portion of road.

9. A system comprising one or more computing devices, the one or more computing devices being configured to:

access a plurality of panoramic images, each panoramic image being associated with multi-dimensional location information defined in at least two dimensions, a one-dimensional (1D) snap location along a path at least partially traveled during image capture, three dimensional (3D) geometry data corresponding to a surface of an object depicted in the panoramic image, and time information identifying when the panoramic image was captured;

for a first panoramic image of the plurality, query the plurality of panoramic images and select a second panoramic image of the plurality such that a second 1D snap location associated with the second panoramic image is closest to a first 1D snap location associated with the first panoramic image relative to 1D snap locations associated with others of the plurality of panoramic images, at least a portion of a geographic area depicted in the first panoramic image is also depicted in the second panoramic image, and first time information associated with the first panoramic image and second time information associated with the second panoramic image indicate that the first panoramic image and the second panoramic image were captured on different days;

determine whether the second 1D snap location is within a threshold range of the first 1D snap location;

provide the first panoramic image for display with an indication that the second panoramic image is available when the second 1D snap location is within the threshold range of the first 1D snap location;

determine a zoom level for the second panoramic image based on first 3D geometry data and first multi-dimensional location information of the first panoramic image, and second 3D geometry data and second multi-dimensional location information of the second panoramic image, such that the zoom level for the second panoramic image is consistent with a zoom level of the first panoramic image; and provide the second panoramic image for display with the zoom level for the second panoramic image.

10. The system of claim 9, wherein the one or more computing devices are further configured to:

receive view port information identifying a viewing angle of a display of the first panoramic image and a zoom level of the display of the first panoramic image, and determine the zoom level for the second panoramic image further by:

identifying a first distance to a three dimensional point on a surface of an object in the viewing angle of the display of the first panoramic image based on the first 3D geometry data, the first multi-dimensional location information, and the zoom level of the display of the first panoramic image;

identifying a second distance to the three dimensional point on the surface of the object in the second panoramic image based on the first location information and the second 3D geometry data; and determining the zoom level for the second panoramic image using at least the first distance and the second distance.

11. The system of claim 10, wherein determining the zoom level for the second panoramic image is further based on a ratio of the first distance to the second distance.

12. The system of claim 10, wherein the second distance is a linear distance between the three dimensional point and the second location information.

13. The system of claim 10, wherein when the zoom level of the display of the first panoramic image indicates that the first panoramic is not zoomed in, the first distance is a linear distance between the first location of the first panoramic image and the three dimensional point on the surface of the object in the viewing angle of the display of the first panoramic image.

14. The system of claim 10, wherein the view port information further identifies a viewing angle of a display of the first panoramic image, and the one or more computing devices are further configured to:
 determine a viewing angle of the second panoramic image based on the viewing angle; and
 wherein the viewing angle for the second panoramic image is provided with the second panoramic image.

15. A non-transitory computer-readable storage medium on which computer readable instructions of a program are stored, the instructions, when executed by one or more processors, cause the one or more processors to perform a method, the method comprising:
 accessing a plurality of panoramic images, each panoramic image being associated with multi-dimensional location information defined in at least two dimensions, a one-dimensional (1D) snap location along a path at least partially traveled during image capture, three dimensional (3D) geometry data corresponding to a surface of an object depicted in the panoramic image, and time information identifying when the panoramic image was captured;
 for a first panoramic image of the plurality, query the plurality of panoramic images and select a second panoramic image of the plurality such that a second 1D snap location associated with the second panoramic image is closest to a first 1D snap location associated with the first panoramic image relative to 1D snap locations associated with others of the plurality of panoramic images, at least a portion of a geographic area depicted in the first panoramic image is also depicted in the second panoramic image, and first time information associated with the first panoramic image and second time information associated with the second panoramic image indicate that the first panoramic image and the second panoramic image were captured on different days;
 determining whether the second 1D snap location is within a threshold range of the first 1D snap location;
 providing the first panoramic image for display with an indication that the second panoramic image is available when the second 1D snap location is within the threshold range of the first 1D snap location;
 determining a zoom level for the second panoramic image based on first 3D geometry data and first multi-dimensional location information of the first panoramic image, and second 3D geometry data and second multi-dimensional location information of the second panoramic image, such that the zoom level for the second panoramic image is consistent with a zoom level of the first panoramic image; and
 providing the second panoramic image for display with the zoom level for the second panoramic image.

16. The medium of claim 15, wherein the method further comprises:
 receiving view port information identifying a viewing angle of a display of the first panoramic image and a zoom level of the display of the first panoramic image, and
 determining the zoom level for the second panoramic image further includes:
  identifying a first distance to a three dimensional point on a surface of an object in the viewing angle of the display of the first panoramic image based on the first 3D geometry data, the first multi-dimensional location information, and the zoom level of the display of the first panoramic image;
  identifying a second distance to the three dimensional point on the surface of the object in the second panoramic image based on the first location information and the second 3D geometry data; and
  determining the zoom level for the second panoramic image using at least the first distance and the second distance.

17. The medium of claim 16, wherein determining the zoom level for the second panoramic image is further based on a ratio of the first distance to the second distance.

18. The medium of claim 16, wherein the second distance is a linear distance between the three dimensional point and the second location information.

19. The medium of claim 16, wherein when the zoom level of the display of the first panoramic image indicates that the first panoramic is not zoomed in, the first distance is a linear distance between the first location of the first panoramic image and the three dimensional point on the surface of the object in the viewing angle of the display of the first panoramic image.

20. The medium of claim 16, wherein the view port information further identifies a viewing angle of a display of the first panoramic image, and the method further comprises:
 determining a viewing angle of the second panoramic image based on the viewing angle; and
 the viewing angle for the second panoramic image is provided with the second panoramic image.

* * * * *